United States Patent
Thomas et al.

(10) Patent No.: US 8,732,756 B2
(45) Date of Patent: *May 20, 2014

(54) INTERACTIVE MEDIA GUIDE WITH MEDIA GUIDANCE INTERFACE

(71) Applicant: United Video Properties, Inc., Tulsa, OK (US)

(72) Inventors: William L. Thomas, Evergreen, CO (US); W. Benjamin Herrington, Tulsa, OK (US); David M. Berezowski, Tulsa, OK (US); Robert A. Knee, Lansdale, PA (US); Michael D. Ellis, Boulder, CO (US); Todd A. Walker, Bixby, OK (US); M. Scott Reichardt, Tulsa, OK (US); L. Joe Hedges, Tulsa, OK (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/845,809

(22) Filed: Mar. 18, 2013

(65) Prior Publication Data

US 2013/0219430 A1  Aug. 22, 2013

Related U.S. Application Data

(63) Continuation of application No. 13/005,975, filed on Jan. 13, 2011, now Pat. No. 8,424,038, which is a continuation of application No. 09/829,806, filed on Apr. 10, 2001, now Pat. No. 7,895,624.

(60) Provisional application No. 60/195,946, filed on Apr. 10, 2000, provisional application No. 60/202,306, filed on May 5, 2000.

(51) Int. Cl.
*H04N 7/10* (2006.01)

(52) U.S. Cl.
USPC .............................. 725/44; 709/219

(58) Field of Classification Search
USPC ................ 725/37–61, 87–118; 709/217–232
See application file for complete search history.

(56) References Cited

U.S. PATENT DOCUMENTS

| | | | |
|---|---|---|---|
| 4,355,415 | A | 10/1982 | George et al. |
| 4,605,964 | A | 8/1986 | Chard |
| 4,638,424 | A | 1/1987 | Beglin et al. |
| 4,641,203 | A | 2/1987 | Miller |
| 4,680,647 | A | 7/1987 | Moriyama |

(Continued)

FOREIGN PATENT DOCUMENTS

| | | |
|---|---|---|
| CA | 2388167 | 11/1999 |
| CA | 2509937 | 11/1999 |

(Continued)

OTHER PUBLICATIONS

International Preliminary Examination Report for Application No. PCT/US97/04074, dated Oct. 15, 1998, 7 pages.

(Continued)

*Primary Examiner* — Annan Shang
(74) *Attorney, Agent, or Firm* — Ropes & Gray LLP

(57) ABSTRACT

Systems and methods for providing guidance to users for finding media are described. Such systems and methods may be provided in interactive media guides such as program guides, web browsers, or other suitable interactive media guides.

20 Claims, 21 Drawing Sheets

(56) References Cited

U.S. PATENT DOCUMENTS

| | | |
|---|---|---|
| 4,694,490 A | 9/1987 | Harvey et al. |
| 4,706,121 A | 11/1987 | Young |
| 4,718,107 A | 1/1988 | Hayes |
| 4,754,326 A * | 6/1988 | Kram et al. ................ 379/93.25 |
| 4,771,375 A | 9/1988 | Beglin et al. |
| 4,837,584 A | 6/1989 | Sharkey et al. |
| 4,847,698 A | 7/1989 | Freeman |
| 4,857,999 A | 8/1989 | Welsh |
| 4,908,707 A | 3/1990 | Kinghorn |
| 4,908,713 A * | 3/1990 | Levine ........................ 386/291 |
| 4,930,158 A * | 5/1990 | Vogel ......................... 386/253 |
| 4,949,187 A | 8/1990 | Cohen |
| 4,959,720 A | 9/1990 | Duffield et al. |
| 4,977,455 A | 12/1990 | Young |
| 4,991,012 A | 2/1991 | Yoshino |
| 5,047,867 A | 9/1991 | Strubbe et al. |
| 5,053,948 A | 10/1991 | DeClute et al. |
| 5,057,932 A | 10/1991 | Lang |
| 5,109,279 A | 4/1992 | Ando |
| 5,111,296 A | 5/1992 | Duffield et al. |
| 5,134,719 A | 7/1992 | Mankovitz |
| 5,151,789 A | 9/1992 | Young |
| 5,172,413 A | 12/1992 | Bradley et al. |
| 5,187,589 A | 2/1993 | Kono et al. |
| 5,195,134 A | 3/1993 | Inoue |
| 5,200,822 A | 4/1993 | Bronfin et al. |
| 5,223,924 A | 6/1993 | Strubbe |
| 5,231,543 A | 7/1993 | Kubota et al. |
| 5,253,066 A | 10/1993 | Vogel |
| 5,285,284 A | 2/1994 | Takashima et al. |
| 5,293,357 A | 3/1994 | Hallenbeck |
| 5,315,452 A | 5/1994 | Hong |
| 5,335,277 A | 8/1994 | Harvey et al. |
| 5,353,121 A | 10/1994 | Young et al. |
| 5,390,027 A | 2/1995 | Henmi et al. |
| 5,412,720 A | 5/1995 | Hoarty |
| 5,414,569 A | 5/1995 | Sekiguchi et al. |
| 5,442,389 A | 8/1995 | Blahut et al. |
| 5,444,499 A | 8/1995 | Saitoh |
| 5,450,210 A | 9/1995 | Yoo et al. |
| 5,461,415 A | 10/1995 | Wolf et al. |
| 5,469,206 A | 11/1995 | Strubbe et al. |
| 5,479,266 A | 12/1995 | Young et al. |
| 5,479,268 A | 12/1995 | Young et al. |
| 5,479,302 A | 12/1995 | Haines |
| 5,483,278 A | 1/1996 | Strubbe et al. |
| 5,485,197 A | 1/1996 | Hoarty |
| 5,485,221 A | 1/1996 | Banker et al. |
| 5,488,409 A | 1/1996 | Yuen et al. |
| 5,499,103 A | 3/1996 | Mankovitz |
| 5,508,815 A | 4/1996 | Levine |
| 5,517,254 A | 5/1996 | Monta et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,541,738 A | 7/1996 | Mankovitz |
| 5,543,852 A | 8/1996 | Yuen et al. |
| 5,543,929 A | 8/1996 | Mankovitz et al. |
| 5,550,576 A | 8/1996 | Klosterman |
| 5,559,548 A | 9/1996 | Davis et al. |
| 5,559,550 A | 9/1996 | Mankovitz |
| 5,581,614 A | 12/1996 | Ng et al. |
| 5,583,560 A | 12/1996 | Florin et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,491 A | 1/1997 | Hodge et al. |
| 5,594,509 A | 1/1997 | Florin et al. |
| 5,602,582 A | 2/1997 | Wanderscheid et al. |
| 5,614,940 A | 3/1997 | Cobbley et al. |
| 5,616,876 A | 4/1997 | Cluts |
| 5,619,247 A | 4/1997 | Russo |
| 5,619,249 A * | 4/1997 | Billock et al. ................ 725/5 |
| 5,619,274 A | 4/1997 | Roop et al. |
| 5,619,570 A | 4/1997 | Tsutsui |
| 5,621,456 A | 4/1997 | Florin et al. |
| 5,621,579 A | 4/1997 | Yuen |
| 5,629,733 A | 5/1997 | Youman et al. |
| 5,630,119 A | 5/1997 | Aristides et al. |
| 5,632,007 A | 5/1997 | Freeman |
| 5,648,824 A | 7/1997 | Dunn et al. |
| 5,652,613 A | 7/1997 | Lazarus et al. |
| 5,654,747 A | 8/1997 | Ottesen et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,659,367 A | 8/1997 | Yuen |
| 5,666,645 A | 9/1997 | Thomas et al. |
| 5,671,607 A | 9/1997 | Clemens et al. |
| 5,675,734 A | 10/1997 | Hair |
| 5,684,511 A | 11/1997 | Westerink et al. |
| 5,684,525 A | 11/1997 | Klosterman |
| 5,686,954 A | 11/1997 | Yoshinobu et al. |
| 5,692,214 A | 11/1997 | Levine |
| 5,694,163 A | 12/1997 | Harrison |
| 5,699,107 A | 12/1997 | Lawler et al. |
| 5,701,383 A | 12/1997 | Russo et al. |
| 5,710,601 A | 1/1998 | Marshall et al. |
| 5,717,452 A | 2/1998 | Janin et al. |
| 5,724,203 A | 3/1998 | Kwoh et al. |
| 5,724,546 A | 3/1998 | Tsutsui |
| 5,727,060 A | 3/1998 | Young |
| 5,731,844 A | 3/1998 | Rauch et al. |
| 5,732,216 A | 3/1998 | Logan et al. |
| 5,737,029 A | 4/1998 | Ohkura et al. |
| 5,737,030 A | 4/1998 | Hong et al. |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,761,607 A | 6/1998 | Gudesen |
| 5,768,528 A | 6/1998 | Stumm |
| 5,771,354 A | 6/1998 | Crawford |
| 5,774,859 A | 6/1998 | Houser et al. |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,790,198 A | 8/1998 | Roop et al. |
| 5,790,935 A | 8/1998 | Payton |
| 5,796,952 A | 8/1998 | Davis et al. |
| 5,798,785 A | 8/1998 | Hendricks et al. |
| 5,801,787 A | 9/1998 | Schein et al. |
| 5,802,284 A | 9/1998 | Karlton et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,818,438 A | 10/1998 | Howe et al. |
| 5,819,019 A | 10/1998 | Nelson |
| 5,828,945 A | 10/1998 | Klosterman |
| 5,844,620 A | 12/1998 | Coleman et al. |
| 5,850,218 A | 12/1998 | LaJoie et al. |
| 5,851,149 A | 12/1998 | Xidos et al. |
| 5,880,768 A | 3/1999 | Lemmons et al. |
| 5,883,621 A | 3/1999 | Iwamura |
| 5,892,536 A | 4/1999 | Logan et al. |
| 5,899,576 A | 5/1999 | Fukuzawa |
| 5,909,212 A | 6/1999 | Nishina et al. |
| 5,920,700 A | 7/1999 | Gordon et al. |

(56) References Cited

U.S. PATENT DOCUMENTS

| | | | |
|---|---|---|---|
| 5,949,954 A | 9/1999 | Young et al. |
| 5,973,683 A | 10/1999 | Cragun et al. |
| 5,988,078 A | 11/1999 | Levine |
| 5,995,090 A | 11/1999 | Mamiya et al. |
| 5,999,688 A | 12/1999 | Iggulden et al. |
| 6,002,444 A | 12/1999 | Marshall et al. |
| 6,005,565 A | 12/1999 | Legall et al. |
| 6,006,257 A | 12/1999 | Slezak |
| 6,008,803 A | 12/1999 | Rowe et al. |
| 6,021,433 A | 2/2000 | Payne et al. |
| 6,023,267 A | 2/2000 | Chapuis et al. |
| 6,052,145 A | 4/2000 | Macrae et al. |
| 6,058,238 A | 5/2000 | Ng |
| 6,091,883 A | 7/2000 | Artigalas et al. |
| 6,091,884 A | 7/2000 | Yuen et al. |
| 6,115,057 A | 9/2000 | Kwoh et al. |
| 6,122,011 A | 9/2000 | Dias et al. |
| 6,125,230 A | 9/2000 | Yaginuma |
| 6,125,231 A | 9/2000 | Yuen et al. |
| 6,147,715 A | 11/2000 | Yuen et al. |
| 6,167,188 A | 12/2000 | Young et al. |
| 6,169,844 B1 | 1/2001 | Arai |
| 6,177,931 B1 | 1/2001 | Alexander et al. |
| 6,185,360 B1 | 2/2001 | Inoue et al. |
| 6,208,335 B1 | 3/2001 | Gordon et al. |
| 6,219,489 B1 | 4/2001 | Ohta et al. |
| 6,219,839 B1 | 4/2001 | Sampsell |
| 6,226,444 B1 | 5/2001 | Goldschmidt Iki et al. |
| 6,233,389 B1 | 5/2001 | Barton et al. |
| 6,240,241 B1 | 5/2001 | Yuen |
| 6,324,338 B1 | 11/2001 | Wood et al. |
| 6,327,418 B1 | 12/2001 | Barton |
| 6,334,022 B1 | 12/2001 | Ohba et al. |
| 6,344,939 B2 | 2/2002 | Oguro |
| 6,377,745 B2 | 4/2002 | Akiba et al. |
| 6,419,137 B1 | 7/2002 | Marshall et al. |
| 6,441,832 B1 | 8/2002 | Tao et al. |
| 6,441,862 B1 | 8/2002 | Yuen et al. |
| RE37,881 E | 10/2002 | Haines |
| 6,473,559 B1 | 10/2002 | Knudson et al. |
| 6,487,362 B1 | 11/2002 | Yuen et al. |
| 6,498,895 B2 | 12/2002 | Young et al. |
| 6,505,348 B1 | 1/2003 | Knowles et al. |
| 6,522,342 B1 | 2/2003 | Gagnon et al. |
| 6,553,178 B2 | 4/2003 | Abecassis |
| 6,668,377 B1 | 12/2003 | Dunn |
| 6,684,400 B1 | 1/2004 | Goode et al. |
| 6,732,366 B1 | 5/2004 | Russo |
| 6,788,882 B1 | 9/2004 | Geer et al. |
| 6,820,278 B1 | 11/2004 | Ellis |
| 6,832,385 B2 | 12/2004 | Young |
| 6,850,693 B2 | 2/2005 | Young et al. |
| 6,934,964 B1 | 8/2005 | Schaffer et al. |
| 7,096,486 B1 | 8/2006 | Ukai et al. |
| 7,187,847 B2 | 3/2007 | Young et al. |
| 7,209,640 B2 | 4/2007 | Young et al. |
| 7,529,465 B2 | 5/2009 | Barton et al. |
| 7,533,400 B1 | 5/2009 | Hailey et al. |
| 7,663,700 B2 | 2/2010 | Yuen et al. |
| 7,761,892 B2 | 7/2010 | Ellis et al. |
| 7,784,081 B2 | 8/2010 | Hassell et al. |
| 7,793,322 B2 | 9/2010 | Hassell et al. |
| 7,870,585 B2 | 1/2011 | Ellis et al. |
| 7,895,624 B1* | 2/2011 | Thomas et al. ............... 725/44 |
| 2001/0043795 A1 | 11/2001 | Wood et al. |
| 2002/0181936 A1 | 12/2002 | Yuen et al. |
| 2003/0044165 A1 | 3/2003 | Wood et al. |
| 2003/0149980 A1 | 8/2003 | Ellis et al. |
| 2003/0149988 A1 | 8/2003 | Ellis et al. |
| 2003/0154477 A1 | 8/2003 | Hassell et al. |
| 2003/0154478 A1 | 8/2003 | Hassell et al. |
| 2003/0196201 A1 | 10/2003 | Schein et al. |
| 2004/0008971 A1 | 1/2004 | Young et al. |
| 2004/0128685 A1 | 7/2004 | Hassell et al. |
| 2004/0128686 A1 | 7/2004 | Boyer et al. |
| 2004/0158853 A1 | 8/2004 | Doi et al. |
| 2004/0181814 A1 | 9/2004 | Ellis et al. |
| 2004/0261108 A1 | 12/2004 | Yuen et al. |
| 2005/0044567 A1 | 2/2005 | Young et al. |
| 2005/0204388 A1 | 9/2005 | Knudson et al. |
| 2006/0236360 A1 | 10/2006 | Yuen et al. |
| 2007/0033615 A1 | 2/2007 | Hassell et al. |
| 2008/0184293 A1 | 7/2008 | Yuen et al. |
| 2008/0184306 A1 | 7/2008 | Ellis et al. |
| 2011/0173657 A1 | 7/2011 | Thomas et al. |

FOREIGN PATENT DOCUMENTS

| | | |
|---|---|---|
| CN | 1174477 | 2/1998 |
| EP | 0 401 930 | 12/1990 |
| EP | 0 424 469 | 5/1991 |
| EP | 0 560 593 | 9/1993 |
| EP | 0 584 991 | 3/1994 |
| EP | 0 665 551 | 8/1995 |
| EP | 0 670 652 | 9/1995 |
| EP | 0 629 790 | 1/1996 |
| EP | 0 711 073 | 5/1996 |
| EP | 0 713 334 | 5/1996 |
| EP | 0 744 866 | 11/1996 |
| EP | 0 753 964 | 1/1997 |
| EP | 0 762 756 | 3/1997 |
| EP | 0 763 938 | 3/1997 |
| EP | 0 822 713 | 2/1998 |
| EP | 0 843 468 | 5/1998 |
| EP | 0 849 958 | 6/1998 |
| EP | 0 858 223 | 8/1998 |
| EP | 0 872 834 | 10/1998 |
| EP | 0 874 524 | 10/1998 |
| EP | 0 936 811 | 8/1999 |
| EP | 0 940 985 | 9/1999 |
| EP | 0 969 661 | 1/2000 |
| EP | 1 581 001 | 9/2005 |
| EP | 0 848 383 | 10/2005 |
| GB | 2 219 886 | 12/1989 |
| GB | 2 298 544 | 9/1996 |
| GB | 2340633 | 2/2000 |
| JP | 62-060378 | 3/1987 |
| JP | 01-209399 | 8/1989 |
| JP | 01-248389 | 10/1989 |
| JP | 03-226083 | 10/1991 |
| JP | 03-286483 | 12/1991 |
| JP | 05-101471 | 4/1993 |
| JP | 05-260554 | 10/1993 |
| JP | 06-111413 | 4/1994 |
| JP | 06-133334 | 5/1994 |
| JP | 06-236592 | 8/1994 |
| JP | 06-303541 | 10/1994 |
| JP | 07-044930 | 2/1995 |
| JP | 7-230666 | 8/1995 |
| JP | 08-065322 | 3/1996 |
| JP | 8-77763 | 3/1996 |
| JP | 10-248050 | 5/1996 |
| JP | 9-245467 | 9/1997 |
| JP | 11-86377 | 9/1997 |
| JP | 9-259515 | 10/1997 |
| JP | 09-289630 | 11/1997 |
| JP | 10-042242 | 2/1998 |
| JP | 10-91534 | 4/1998 |
| JP | 10-093879 | 4/1998 |
| JP | 10-93905 | 4/1998 |
| JP | 10-93936 | 4/1998 |
| JP | 10-112087 | 4/1998 |
| JP | 10-164487 | 6/1998 |
| JP | 10-191221 | 7/1998 |
| JP | 10-215440 | 8/1998 |
| JP | 08-139747 | 9/1998 |
| JP | 10-243309 | 9/1998 |
| JP | 10-243344 | 9/1998 |
| JP | 10-243352 | 9/1998 |
| JP | 10-013756 | 10/1998 |
| JP | 11-205707 | 7/1999 |
| JP | 11/261808 | 9/1999 |
| JP | 2008-178148 | 7/2008 |
| JP | 2012-44681 | 3/2012 |

(56) References Cited

FOREIGN PATENT DOCUMENTS

| | | |
|---|---|---|
| WO | WO 88/04507 | 6/1988 |
| WO | WO 90/00847 | 1/1990 |
| WO | WO 90/15507 | 12/1990 |
| WO | WO 91/00670 | 1/1991 |
| WO | WO 91/07050 | 5/1991 |
| WO | WO 92/04801 | 3/1992 |
| WO | WO 92/22983 | 12/1992 |
| WO | WO 93/04473 | 3/1993 |
| WO | WO 93/08542 | 4/1993 |
| WO | WO 94/13107 | 6/1994 |
| WO | WO 95/01058 | 1/1995 |
| WO | WO 95/01059 | 1/1995 |
| WO | WO 95/04431 | 2/1995 |
| WO | WO 95/11567 | 4/1995 |
| WO | WO 95/18449 | 7/1995 |
| WO | WO 95/28799 | 10/1995 |
| WO | WO 95/31069 | 11/1995 |
| WO | WO 95/32584 | 11/1995 |
| WO | WO 95/32585 | 11/1995 |
| WO | WO 95/32587 | 11/1995 |
| WO | WO 96/07270 | 3/1996 |
| WO | WO 96/09721 | 3/1996 |
| WO | WO 96/13932 | 5/1996 |
| WO | WO 96/25821 | 8/1996 |
| WO | WO 96/27982 | 9/1996 |
| WO | WO 96/31980 | 10/1996 |
| WO | WO 96/33572 | 10/1996 |
| WO | WO 96/33579 | 10/1996 |
| WO | WO 96/34491 | 10/1996 |
| WO | WO 96/36172 | 11/1996 |
| WO | WO 96/41472 | 12/1996 |
| WO | WO 96/41478 | 12/1996 |
| WO | WO 97/05616 | 2/1997 |
| WO | WO 97/13368 | 4/1997 |
| WO | WO 97/31479 | 8/1997 |
| WO | WO 97/32434 | 9/1997 |
| WO | WO 97/34413 | 9/1997 |
| WO | WO 97/34414 | 9/1997 |
| WO | WO 97/40623 | 10/1997 |
| WO | WO 97/42763 | 11/1997 |
| WO | WO 97/46008 | 12/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/48230 | 12/1997 |
| WO | WO 97/49057 | 12/1997 |
| WO | WO 97/49237 | 12/1997 |
| WO | WO 97/49242 | 12/1997 |
| WO | WO 98/01995 | 1/1998 |
| WO | WO 98/06219 | 2/1998 |
| WO | WO 98/07277 | 2/1998 |
| WO | WO 98/10589 | 3/1998 |
| WO | WO 98/12872 | 3/1998 |
| WO | WO 98/16056 | 4/1998 |
| WO | WO 98/17064 | 4/1998 |
| WO | WO 98/26584 | 6/1998 |
| WO | WO 98/26594 | 6/1998 |
| WO | WO 98/26596 | 6/1998 |
| WO | WO 98/37694 | 8/1998 |
| WO | WO 98/38831 | 9/1998 |
| WO | WO 98/39893 | 9/1998 |
| WO | WO 98/47279 | 10/1998 |
| WO | WO 98/47283 | 10/1998 |
| WO | WO 98/47289 | 10/1998 |
| WO | WO 98/10589 | 12/1998 |
| WO | WO 98/56188 | 12/1998 |
| WO | WO 99/03267 | 1/1999 |
| WO | WO 99/13641 | 3/1999 |
| WO | WO 99/20049 | 4/1999 |
| WO | WO 99/33265 | 7/1999 |
| WO | WO 99/57839 | 11/1999 |
| WO | WO 99/60784 | 11/1999 |
| WO | WO 99/60790 | 11/1999 |
| WO | WO 99/63759 | 12/1999 |
| WO | WO 00/01149 | 1/2000 |
| WO | WO 00/02385 | 1/2000 |
| WO | WO 00/04706 | 1/2000 |
| WO | WO 00/05885 | 2/2000 |
| WO | WO 00/07368 | 2/2000 |
| WO | WO 00/08852 | 2/2000 |
| WO | WO 00/04706 | 3/2000 |
| WO | WO 00/11869 | 3/2000 |
| WO | WO 00/16548 | 3/2000 |
| WO | WO 00/27122 | 5/2000 |
| WO | WO 00/33560 | 6/2000 |
| WO | WO 00/46986 | 8/2000 |
| WO | WO 00/48395 | 8/2000 |
| WO | WO 00/78045 | 12/2000 |
| WO | WO 01/01689 | 1/2001 |
| WO | WO 01/43424 | 6/2001 |

OTHER PUBLICATIONS

Supplementary European Search Report and Annex for EPA No. EP 97 91 5090, dated Mar. 16, 2000.
Computer Science: An OvervieW, 5th Edition, Addison Wesley, ISBN 0-8053-4632-5, pp. 25 to 28.
"Startup puts MPEG-2 encoder in fast forward", EE Times.
Article entitled "Automating in a digital world, servers lead the way into the new realm of DIV", Broadcasting and Cable, published Nov. 24, 1997.
Results listing from web.archive.erq showing the archive date of Oct. 9, 1997 as the archived date of document D3.
European Search Opinion dated Dec. 19, 2005.
FTP file listing of doe/resource-guide/front-matter_at_ftp.cs.toronto.edu.
IBM Technical Disclosure Bulletin, vol. 33, No. 3B, published Aug. 1990.
Louth Automation website (vvvvw.iouth.com) dated Aug. 1997.
Manual for Internet Explorer 4—Chapter 9—Browser Features and Functionality.
Norton Backup, Version 1.0, User's Guide and reference, published in 1990 (chapters 3 and 4).
Overview of Pro-Bell/Chyron's MAPP software published on or after Jan. 1999.
RFC 765—File Transfer Protocol Specification.
Sony SLV-7601IF et al. operating instructions (Sony 2") , published in 1995.
The New York Times on the Web, "2 Makers Plan Introductions of Digital VCR" by John Markoff, Mar. 29, 1999.
TV Guide Magazine dated Feb. 4-10, 1989 (excerpts).
Hofmann, Neumann, Oberlies, and Schadwinkel, "Videotext Programmiert Videorecorder," Rundfunktechnische Mitteilungen, Nov.-Dec. 1982, pp. 254-257 (translation attached).
"Electronic Programme Guide (EPG); Protocol for a TV Guide using electronic data transmission" by European Telecommunication Standards Institute, May 1997, Valbonne, France, publication No. ETS 300 707.
Saito, Takeshi, et al., "Homenetwork Architecture Considering Digital Home Appliance," Technical Committee meeting of the Institute of Electronics, Information and Communication Engineers (IEICE), Japan, Nov. 6, 1997, vol. 97, No. 368, p. 57-64.
"Windows 98 Feature Combines TV, Terminal and the Internet," New York Times, Aug. 18, 1998.

* cited by examiner

INTERACTIVE MEDIA GUIDE WITH MEDIA GUIDANCE INTERFACE

CROSS-REFERENCE TO RELATED APPLICATIONS

This application is a continuation of U.S. patent application Ser. No. 13/005,975, filed Jan. 13, 2011 (pending), which is a continuation of U.S. patent application Ser. No. 09/829,806, filed Apr. 10, 2001 (now U.S. Pat. No. 7,895,624), which claims the benefit of U.S. Provisional Patent Application No. 60/195,946, filed Apr. 10, 2000, and U.S. Provisional Patent Application No. 60/202,306, filed May 5, 2000, all of which are hereby incorporated by reference herein in their entireties.

BACKGROUND OF THE INVENTION

Video and audio media, such as television programs, pay-per-view programs, near-video-on-demand (NVOD) programs, video-on-demand (VOD) programs, music, promotional material, and other types of media, may be distributed to viewers over wired and wireless networks. Suitable wired and wireless networks may include, for example, broadcast television system networks, one-way and two-way cable television system networks, digital broadcasting services (DBS) and other satellite delivery services networks, the Internet, and other suitable types of networks. Near video-on-demand (NVOD) and video-on-demand (VOD) systems have been developed that allow television viewers to watch programs nearly on demand or on demand.

Viewers and listeners of such media typically record such media on videocassettes, audiocassettes, and other storage media. More recently, products have been developed that allow users to manage their viewing experiences and record media with increased flexibility. Personal video recorders (PVRs), such as those provided by TIVO and REPLAY, record programs on hard-disk drives. Users can schedule programs for recording and play them back at a later time. These systems also record what users are watching in real-time, allowing users to pause real-time programs when, for example, they must leave the room. Users may resume their viewing upon returning, where they left off, and may even fast forward through commercials until they reach the point at which the program is currently provided. Users may also rewind programs.

Recording capabilities of current technologies and the vast amount of media offered through current media distribution systems such as cable television systems, digital broadcasting services, the Internet, and other systems, provide users with an enormous amount of available media at any given point in time. When a user asks "what's on now", the answer can be any one of a number of different types of media from different sources. Improving the user interfaces of interactive media guides, such as television program guides, guides for audio services, guides for personal video recorders (PVRS), or any other suitable interactive media guide, may increase the ease with which users navigate through stored and distributed media.

SUMMARY OF THE INVENTION

This invention relates to interactive media guides and more particularly, to program guides that provide guidance for large amounts of media. Various features in accordance with some embodiments of the present invention are described, for example, in Walker, et al. U.S. patent application Ser. No. 09/829,806, filed Apr. 10, 2001 know U.S. Pat. No. 7,895, 624), Thomas, et al., U.S. Provisional Patent Application No. 60/195,946, filed Apr. 10, 2000, and Walker, U.S. Provisional Patent Application No. 60/202,306, filed May 5, 2000, each of which are hereby incorporated by reference herein in their entireties.

The interactive media guide of the present invention may be used for any type of distributed media (e.g., television programs, VOD programs, NVOD programs, PPV programs, audio programs, etc.), delivered to a user in any suitable way (e.g., via cable, satellite, radio-frequency transmission, Internet, etc.), and for anything the user has recorded. The interactive media guide presents to the user "what's on now" in a user friendly way, by summarizing available distributed and stored media without using information related to the title, source, or content of the media (e.g., the criteria for including media in a group may be arbitrary, user-defined, predefined, or any other suitable criteria). In some embodiments, the interactive media guide of the present invention may include an interactive television program guide implemented using any suitable architecture.

In some embodiments, users are provided with an interactive media guide from which they may access related media. In some embodiments, media may be grouped independent of their title sources, or content, but related in other ways that allow users to more easily search for desired media. For example, suitable groups may be Recent Favorites, Old Favorites, Recommendations, Browsing, Special Interest, Categories, and Preview Scan. In some embodiments, groups may be further divided into sub-groups of media.

Groups and sub-groups may be user-configurable, or may be programmed into the interactive media guide. In some embodiments, groups and sub-groups may be dynamically selected by the interactive media guide based on media that is available, thereby providing the user with dynamic guidance.

In some embodiments of the present invention, media may be grouped in source, title, or content related ways. Media listings may be provided with the number of viewable selections (i.e., "hits") for the source, categories, or other groups. If desired, a combination of approaches may be used, in which the groupings that are not related to title, source, or content may contain sub-groups that are related to media, title, or content. Additionally, groups that are not related to title, source, or content may also contain hits for the number of viewable selections related to the groups.

Further features of the invention, its nature, and various advantages will be more apparent from the accompanying drawings and the following detailed description of the preferred embodiments.

DETAILED DESCRIPTION OF THE INVENTION

The interactive media guide of the present invention may be based on a number of different hardware platforms. Suitable hardware that may be used in implementing the program guide includes hardware such as satellite receivers, personal computer televisions (PC/TVS), personal computers (e.g., with television tuner cards), cable set-top boxes, or any other suitable hardware. In some embodiments, the interactive media guide may be an interactive television program guide. Illustrative interactive television program guide systems are described, for example, in Knee et al. U.S. Pat. No. 5,589,892 and Knudson et al. U.S. patent application Ser. No. 09/357,941, filed Jul. 16, 1999, which are hereby incorporated by reference herein in their entireties. Client-server program guide systems are described, for example, in Ellis et al. U.S. patent application Ser. No. 09/374,043, filed Aug. 13, 1999, which is hereby incorporated by reference herein in its entirety. On-line program guide systems are described, for example, in Boyer et al. U.S. patent application Ser. No. 08/938,028, filed Sep. 18, 1997, which is hereby incorporated by reference herein in its entirety.

In some embodiments, the interactive media guide may allow users to record programs on digital or analog storage devices (e.g., videocassettes, hard disks, floppy discs, flash memory, recordable compact discs (CDS), recordable digital versatile discs (DVDs), or any other type of storage). Interactive media guides having digital storage are described, for example, in Hassell et al. U.S. patent application Ser. No. 09/157,256, filed Sep. 17, 1998, which is hereby incorporated by reference herein in its entirety. Recording of media can also be performed by a program guide or other server. Client-server based program guides with remote server recording are described, for example, in Ellis et al. U.S. patent application Ser. No. 09/332,244, filed Jun. 11, 1999, which is hereby incorporated by reference herein in its entirety. On-line program guides may also record programs or direct a user's equipment to record programs.

Figure 1:
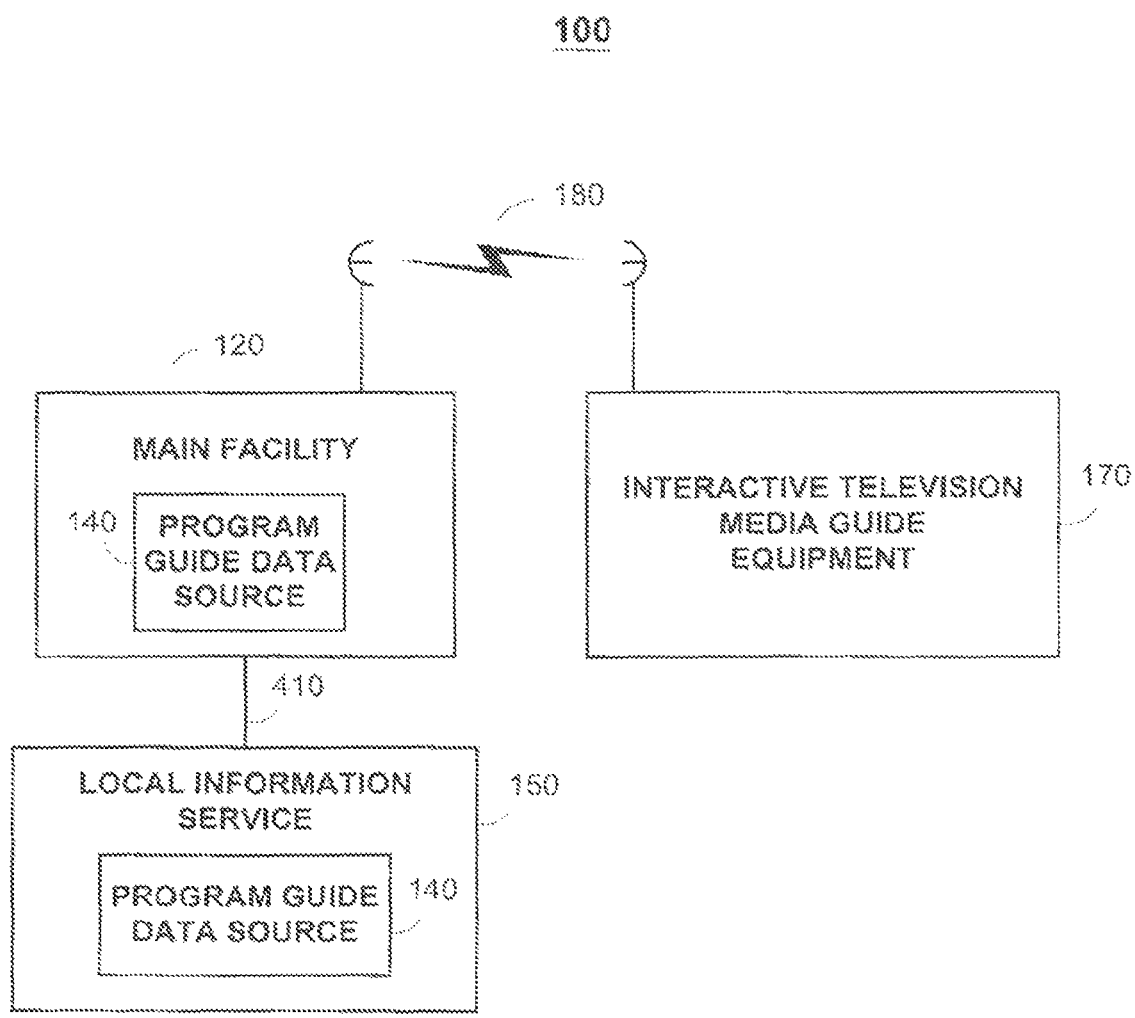
FIG. 1 is a schematic block diagram of an illustrative system in accordance with one embodiment of the present invention.

An illustrative system 100 in accordance with the principles of the present invention is shown in FIG. 1. Main facility 120 provides program guide data from program guide data source 140 to interactive television program guide equipment 170 via communications link 180. There may be multiple program guide data sources but only one has been shown to avoid over-complicating the drawing. If desired, program guide data sources may be located at facilities separate from main facility 120, such as at local information services 150, and have their data provided to main facility 120 for localization and distribution. Program guide data sources 140 may be any suitable computer or computer based system for obtaining data (e.g., manually from an operator, electronically via a computer network or other connection, or via storage media) and converting the data into electronic form for distribution of main facility 120. Communications link 180 may be a satellite link, a telephone network link, a cable or fiber optic link, a microwave link, an Internet link, a combination of such links, or any other suitable communications link. Video signals may also be transmitted over communications link 180 if desired.

Local information service 150 may be any suitable facility for obtaining data particular to a localized region and providing the data to main facility 120 over communications link 410. Local information services 150 may be, for example, a local weather station that measures weather data, a local newspaper that obtains local high school and college sporting information, or any other suitable provider of information. Local information services 150 may also be a local business with a computer for providing main facility 120 with, for example, local ski reports, fishing conditions, menus, etc., or any other suitable provider of information. Link 410 may be a satellite link, a telephone network link, a cable or fiber optic link, a microwave link, an Internet link, a combination of such links, or any other suitable communications link.

The program guide data transmitted by main facility 120 to interactive television program guide equipment 170 may include television programming data (e.g., program identifiers, times, channels, titles, program information, video-on-demand information, promotional information and descriptions) and other data for services other than television program listings (e.g., help text, pay-per-view information, weather information, sports information, music channel information, associated Internet web links, associated software, etc.). There are preferably numerous pieces or installations of interactive television program guide equipment 170, although only one is shown in FIG. 1 to avoid over-complicating the drawing.

Program guide data may be transmitted by main facility 120 to interactive television program guide equipment 170 using any suitable approach. Data files may, for example, be encapsulated as objects and transmitted using a suitable Internet based addressing scheme and protocol stack (e.g., a stack which uses the user datagram protocol (UDP) and internet protocol (IP)). Systems in which program guide data is transmitted from a main facility to distribution facilities are described, for example, in Gollahon et al. U.S. patent application Ser. No. 09/332,624, filed Jun. 11, 1999, which is hereby incorporated by reference herein in its entirety.

An interactive television program guide is implemented on interactive television program guide equipment 170. Five illustrative arrangements for interactive television program guide equipment 170 are shown in FIGS. 2a-2e. As shown, interactive television program guide equipment 170 may include program guide distribution equipment 210 located at program guide distribution facility 160, and user television equipment 220.

Figure 2A:
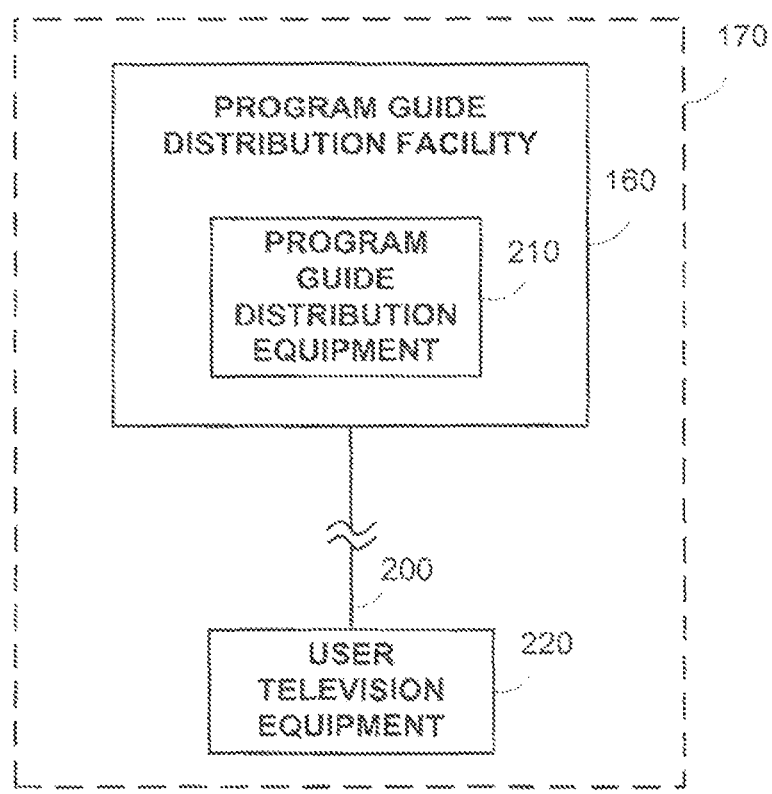
FIGS. 2a-2e show illustrative arrangements for the interactive television program guide equipment of FIG. 1 in accordance with various embodiments of the present invention.
Figure 2B:
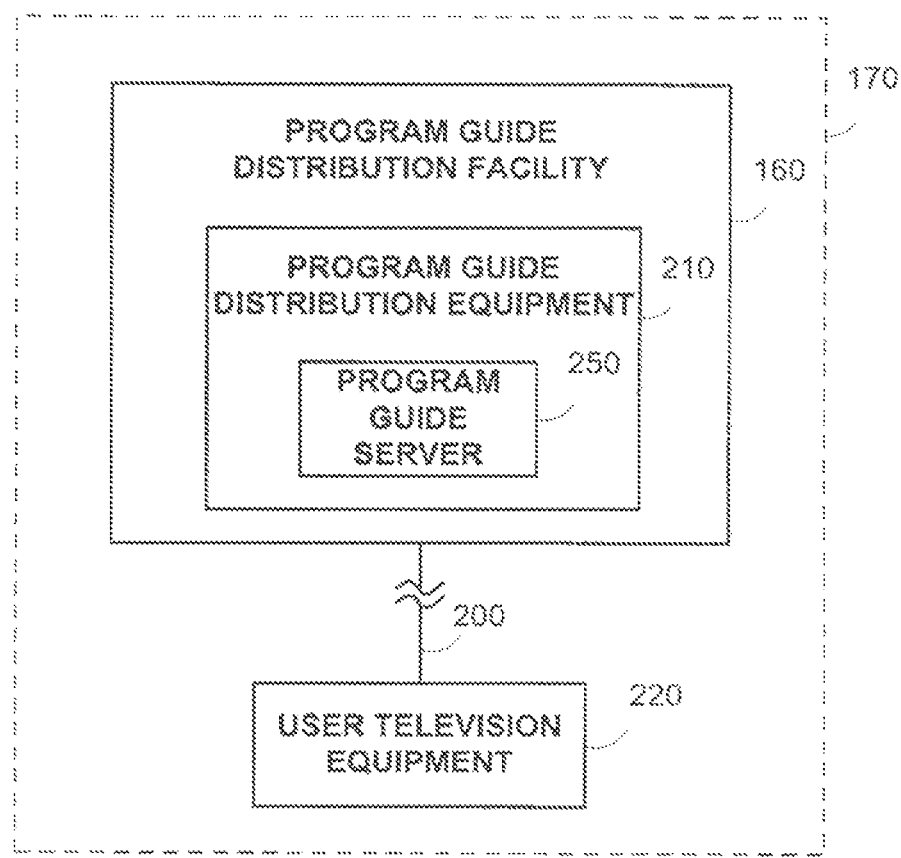
Figure 2C:
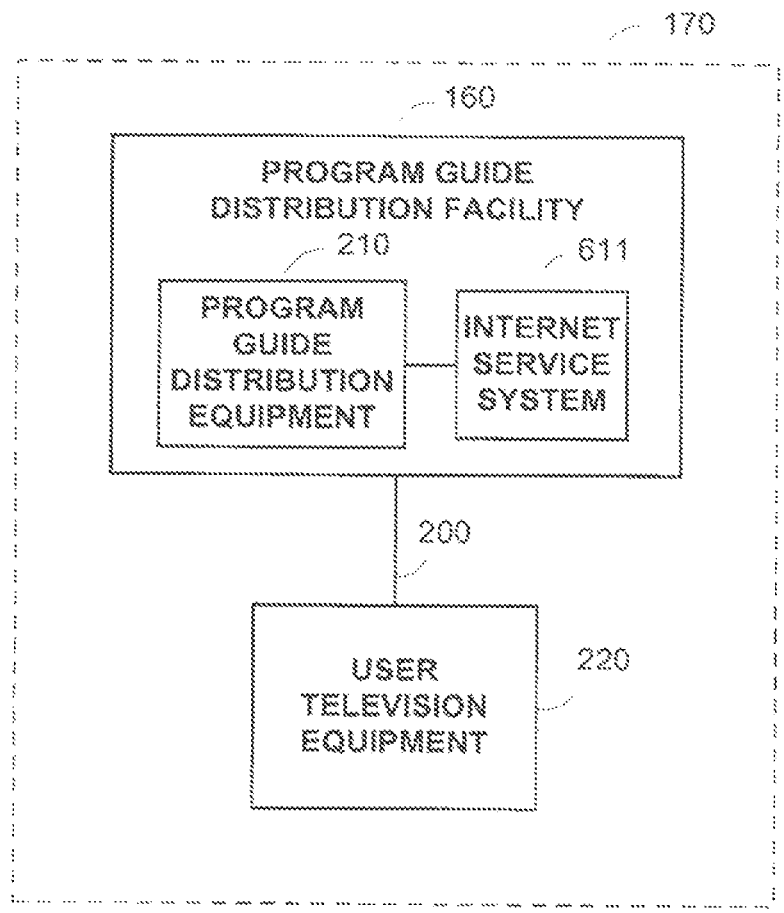
Figure 2D:
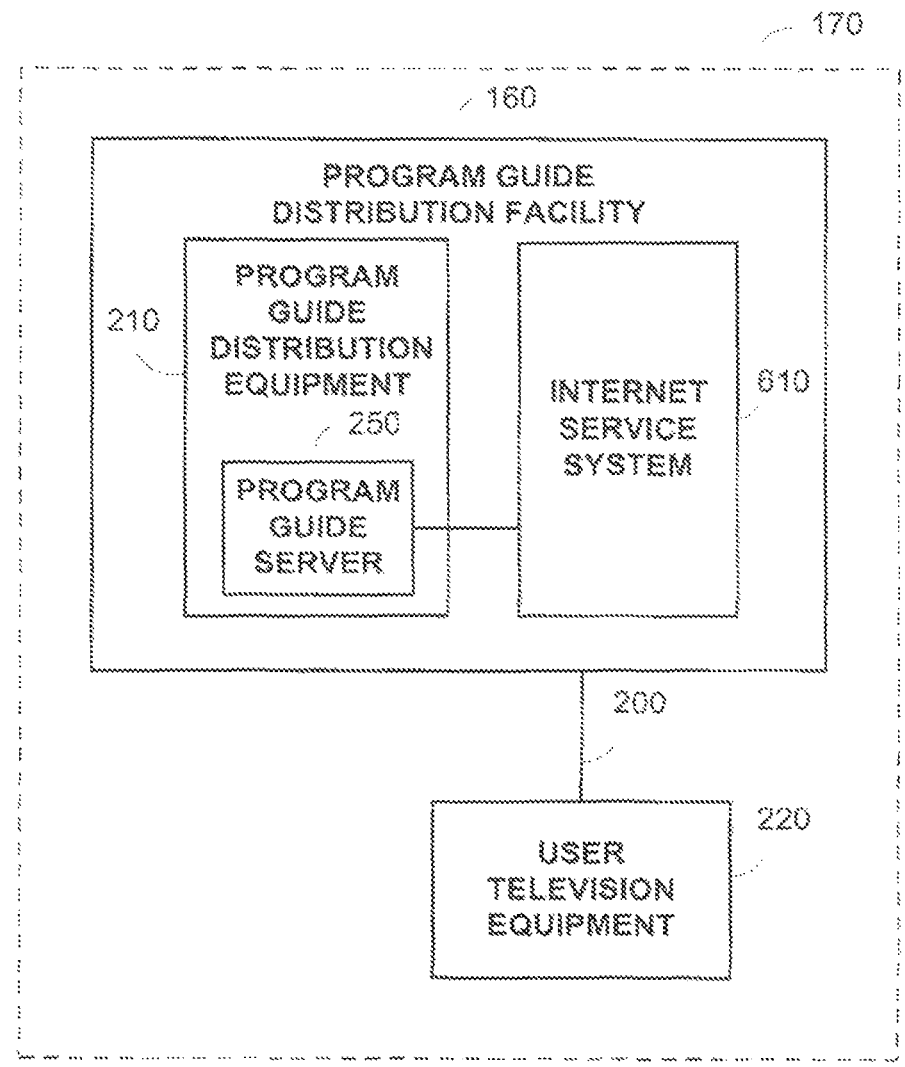

The interactive television program guide may be run completely on user television equipment 220 using the arrangements of FIGS. 2a and 2c, or may be run partially on user equipment 220 and partially on interactive television program guide equipment 210 using a suitable client-server or distributed processing arrangement such as those shown in FIGS. 2b and 2d. Program guide distribution facility 160 may be any suitable distribution facility (e.g., a cable system headend, a broadcast distribution facility, or any other suitable type of distribution facility, and may have distribution equipment 210).

Figure 2E:
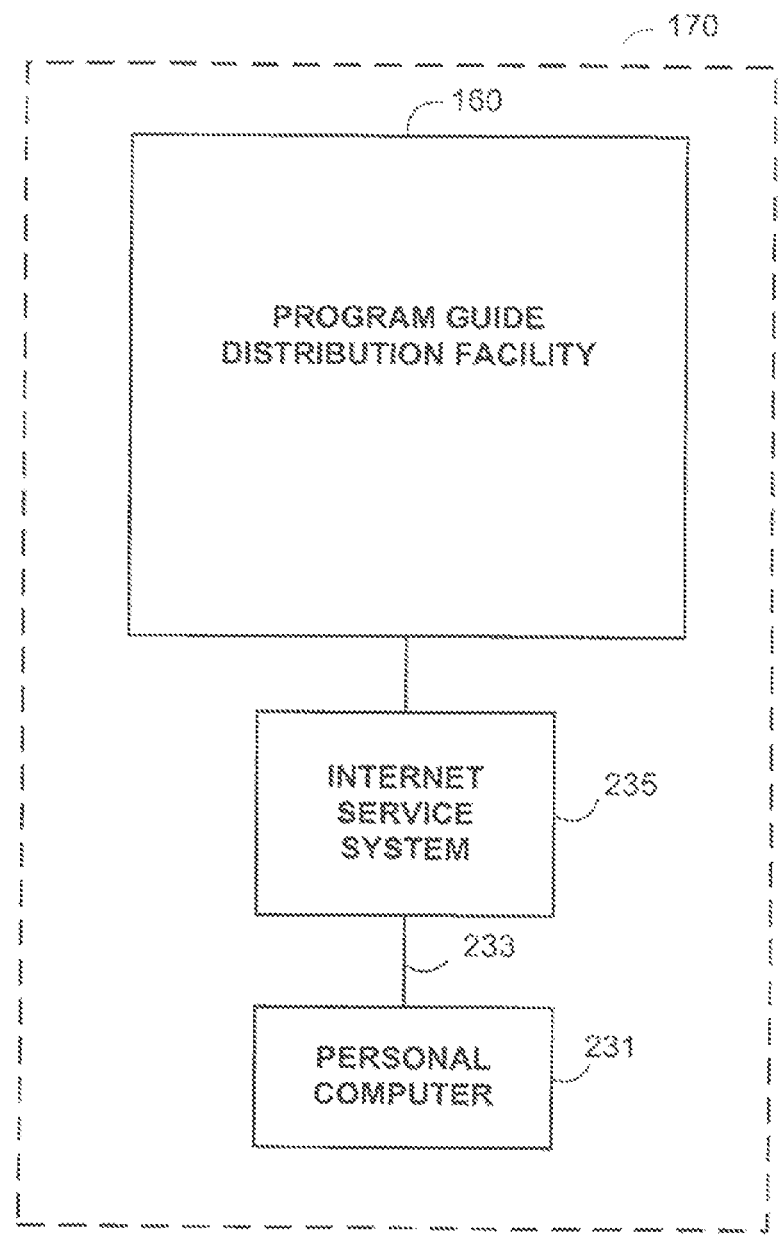

Program guide distribution equipment 210 of FIGS. 2a, 2b, 2c, and 2d may be equipment suitable for providing program guide data to user television equipment 220 over communications path 200. In FIG. 2e, program guide distribution equipment 210 may provide program guide data to Internet service system 235 via, for example, a suitable computer network or Internet link. Program guide distribution equipment 210 may include, for example, suitable transmission hardware for distributing program guide data on a television channel sideband, in the vertical blanking interval of a television channel, using an in-band digital signal, using an out-of-band digital signal, or by any other suitable data transmission technique. Analog or digital video signals (e.g., television programs) may also be distributed by program guide distribution equipment 210 to user television equipment 220 over communications paths 200 on multiple television channels. Alternatively, videos may be distributed to user television equipment 220 from some other suitable distribution facility, such as a cable system headend, a broadcast distribution facility, a satellite television distribution facility, or any other suitable type of media distribution facility.

Communications path 200 may be any communications path suitable for distributing program guide data. Communications path 200 may include, for example, a satellite link, a telephone network link, a cable of fiber optic link, a microwave link, an Internet link, a data-over-cable service interface specification (DOCSIS) link, a combination of such links, or any other suitable communications link. Communications paths 200 preferably have sufficient bandwidth to allow program guide distribution facility 160 or another distribution facility to distribute television programming to user television equipment 220. There are typically multiple pieces of user television equipment 220 and multiple associated communications paths 200, although only one piece of user television equipment 220 and communications path 200 are shown in FIGS. 2a-2d to avoid over-complicating the drawings. If desired, television programming, other media, and program guide data may be provided over separate communications paths.

FIG. 2b shows an illustrative arrangement for interactive television program guide equipment 170 in a client-server based or distributed interactive media guide system. As shown in FIG. 2b, program guide distribution equipment 210 may include program guide server 250. Program guide server 250 may use any suitable combination of hardware and software to provide a client-server based program guide. Program guide server 250 may, for example, run a suitable database engine (e.g., SQL Server by Microsoft) and provide program guide data in response to queries generated by a program guide client implemented on user television equipment 220. If desired, program guide server 250 may be located at main facility 120, or other locations, such as a cable system headend, a broadcast distribution facility, a satellite television distribution facility, or any other suitable type of distribution facility.

The program guide may retrieve program guide data from program guide server 250 using any suitable client-server based approach. The program guide may, for example, pass SQL requests as messages to program guide server 250. In another suitable approach, the program guide may invoke remote procedures that reside on program guide server 250 using one or more remote procedure calls. Program guide server 250 may execute SQL statements for such invoked remote procedures. In still another suitable approach, client objects executed by the program guide may communicate with server objects executed by program guide server 250 using, for example, an object request broker (ORB). This may involve using, for example, Microsoft's Distributed Component Object Model (DCOM) approach, or the Common Object Request Broker Architecture (CORBA), Available from the Object Management Group.

The program guide implemented on interactive television program guide equipment 170 may communicate with program guide server 250 over communications path 200 using any suitable network and transport layer protocols, if desired. They may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, DOCSIS or any other suitable network and transport layer protocols.

FIGS. 2c and 2d show illustrative Internet based interactive television program guide systems. Program guide distribution facility 160 may, for example, include Internet service system 610. Internet service system 610 may use any suitable combination of hardware and software capable of providing program guide data to the guide using an Internet based approach (e.g., the HyperText Transfer Protocol (HTTP)). If desired, Internet service system 610 may be located at a facility that is separate from program guide distribution facility 160.

If the program guide is implemented on user television equipment 220 of interactive television program guide equipment 170 as shown in FIG. 2c, Internet service system 610 (or other suitable equipment at program guide distribution facility 160 that is connected to Internet service system 610) may provide program guide data to user television equipment 220 via the Internet, or via program guide distribution equipment 210 using any suitable Internet-based approach (e.g., using the HyperText Transfer Protocol (HTTP) over a Transmission Control Protocol/Internet Protocol (TCP/IP) type link). If the program guide implemented on interactive television program guide equipment 170 is a client-server guide as shown in FIG. 2d, program guide server 250 may obtain program guide data from Internet service system 610. The program guide may also, however, obtain program guide data from Internet service system 610 via an Internet connection.

In another suitable arrangement, program guide distribution equipment 210 may include computer equipment or other suitable hardware on which a first portion or version of the interactive television program guide is implemented. A second portion or version of the program guide may be implemented on user television equipment 220. The two versions or portions of the interactive media guide may communicate using any suitable peer-to-peer communications scheme (e.g., messaging, remote procedure calls, etc.) and perform interactive media guide functions distributively between program guide distribution facility 160 and user television equipment 220.

Another suitable arrangement in which an on-line program guide is implemented on interactive television program guide television equipment 170 is shown in FIG. 2e. On-line program guide systems are described, for example, in Boyer et al. U.S. patent application Ser. No. 08/938,028, filed Sep. 18, 1997, which is hereby incorporated by reference herein in its entirety. The user may have personal computer (PC) 231 on which a program guide client or web browser is implemented. Personal computer 231 may be connected to Internet service system 235 via Internet link 230. Internet service system 230 may use any suitable combination of computer hardware and software capable of providing an on-line program guide server application or web site. Internet service system 235 is shown as obtaining program guide data from program guide distribution facility 160. In other suitable approaches, Internet service system 235 may obtain information from other systems such as, for example, main facility 120, local information services 1500, or any other suitable source of program guide data.

Figure 3:
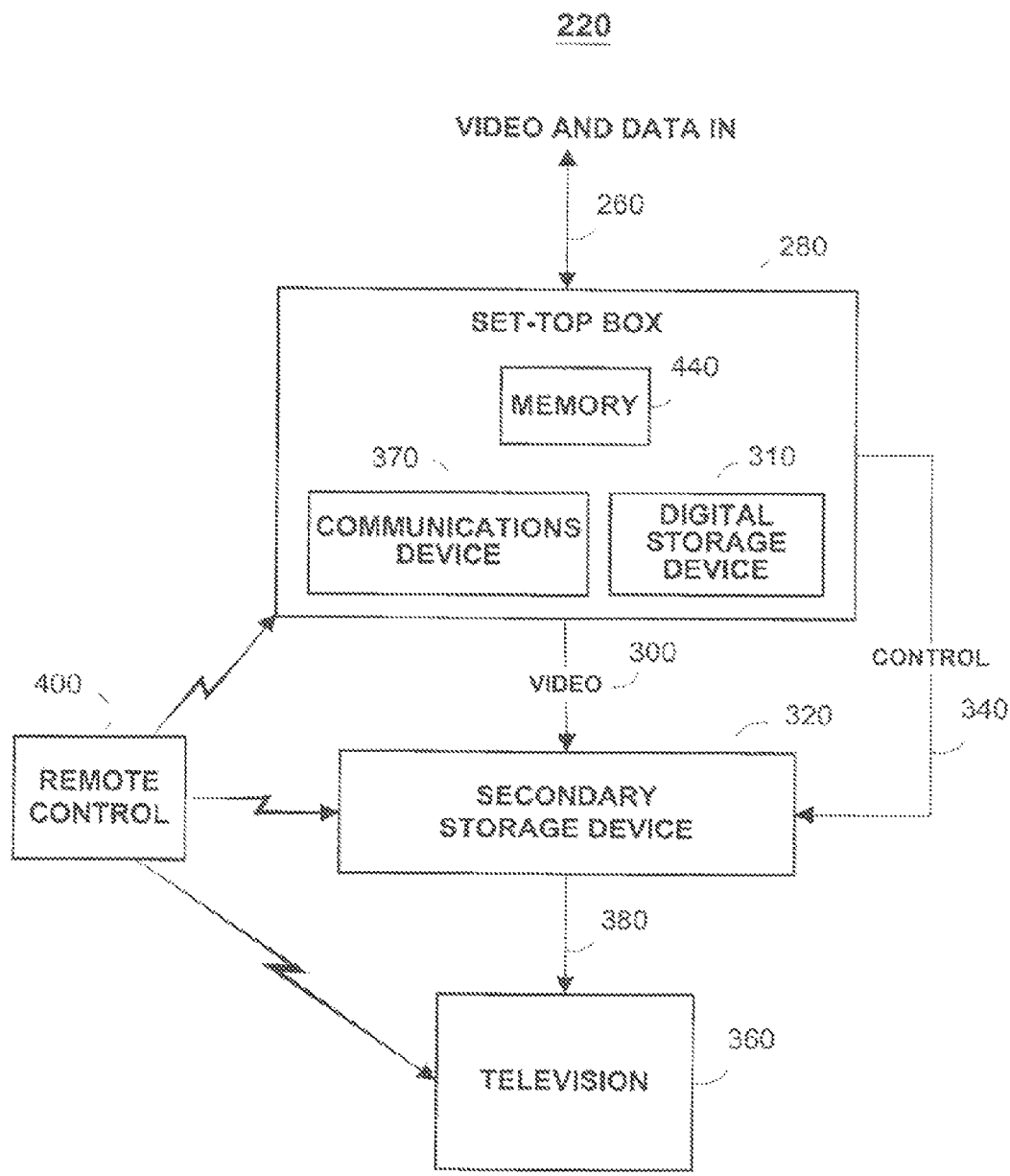
FIG. 3 is an illustrative schematic block diagram of the user television equipment of FIGS. 2a-2e in accordance with one embodiment of the present invention.

An illustrative arrangement for user television equipment 220 is shown in FIG. 3. User television equipment 220 of FIG. 3 receives video or a digital video stream and data from program guide distribution facility 160 (FIG. 1), or some other suitable distribution facility, at input 260. During normal television viewing, a user tunes set-top box 280 to a desired television channel. The signal for that television channel is then provided at video output 300. The signal supplied at output 300 is typically either a radio-frequency (RF) signal on a predefined channel (e.g., channel 3 or 4), or an analog demodulated video signal, but may also be a digital signal provided to television 360 on an appropriate digital bus (e.g., a bus using the Institute of Electrical and Electronics Engineers (IEEE) 1394 standard, (not shown)). The video signal at video output 300 is received by optional secondary storage device 320.

The interactive television program guide may run on set-top box 280, on television 360 (if television 360 has suitable processing circuitry and memory), on a suitable analog or digital receiver connected to television 360, or on digital storage device 310 if digital storage device 310 has suitable processing circuitry and memory. The interactive television program guide may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 320 can be any suitable type of analog or digital program storage device or player (e.g., a videocassette recorder, a digital versatile disc recorder (DVD) recorder, etc.). Program recording and other features may be controlled by set-top box 280 using control path 340.

If secondary storage device 320 is a videocassette recorder, for example, a typical control path 340 involves the use of an infrared transmitter coupled to the infrared receiver in the videocassette recorder that normally accepts commands from a remote control such as remote control 400. Remote control 400 may be used to control set-top box 280, secondary storage device 320, and television 360.

If desired, a user may record programs, program guide data, or a combination thereof in digital form on optional digital storage device 310. Digital storage device 310 may be a writeable optical storage device (such as a DVD recorder capable of handling recordable DVD discs), a magnetic storage device (such as a disk drive or a digital tape drive), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 310 can be contained in set-top box 280 or it can be an external device connected to set-top box 280 via an output port and appropriate interface. If necessary, processing circuitry in set-top box 280 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 310 via an appropriate bus (e.g., a bus using the Institute Electrical and Electronics Engineers (IEEE) 1394 standard), and is stored on digital storage device 310. In another suitable approach, an MPEG-2 data stream or series of files may be received from program guide distribution equipment 210 and stored.

Television 360 receives video signals from secondary storage device 320 via communications path 380. The video signals on communications path 380 may either be generated by secondary storage device 320 when playing back a prerecorded storage medium (e.g., a videocassette or a recordable digital video disc), by digital storage device 310 when playing back a prerecorded digital medium, may be passed through from set-top box 280, may be provided directly to television 360 from set-top box 280 if a secondary storage device 320 is not included in user television equipment 220, or may be received directly by television 360. During normal television viewing, the video signals provided to television 360 correspond to the desired channel to which a user has tuned with set-top box 280. Video signals may also be provided to television 360 by set-top box 280 when set-top box 280 is used to play back information stored on digital storage device 310.

Set-top box 280 may have memory 440. Memory 440 may be any memory or other storage device, such as a random access memory (RAM), read only memory (ROM), flash memory, a hard disk drive, a combination of such devices, etc., that is suitable for storing program guide application instructions and program guide data for use by the program guide.

Set-top box 280 may have communications device 370 for communicating directly with program guide distribution equipment 210, program guide server 250 or Internet service system 610 over communications path 200. Communications device 370 may be a modem (e.g., any suitable analog or digital standard, cellular, or cable modem), network interface card (e.g., an Ethernet card, Token ring card, etc.), or other suitable communication device. Communications device 370 may also be a personal computer with an Internet connection in, for example, the arrangement shown in FIGS. 2c and 2d.

Television 360 may also have such a suitable communications device if desired. In an alternative approach, user television equipment 220 may communicate with Internet service system 610 via distribution equipment 210 using a suitable return path.

Figure 4:
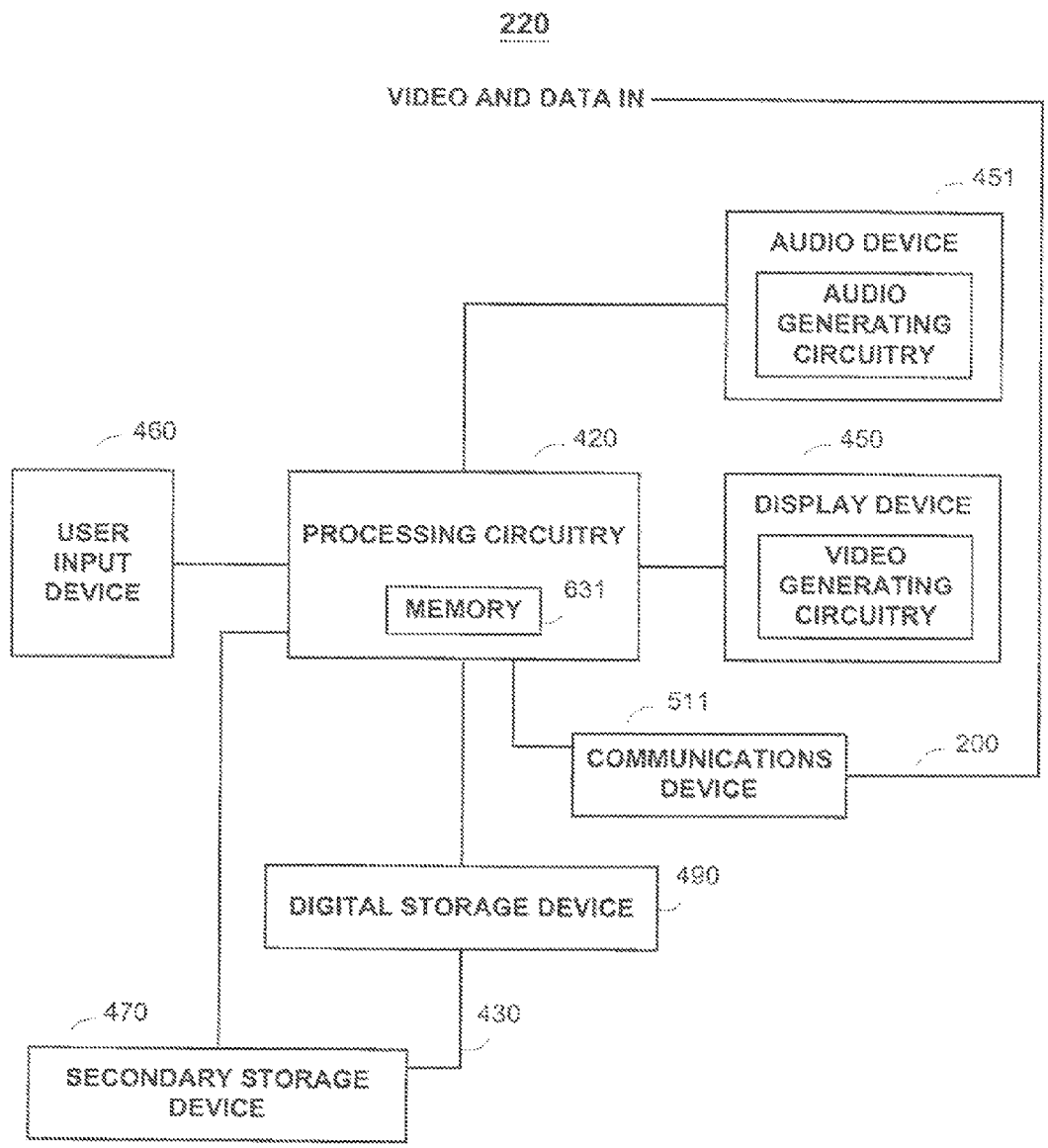
FIG. 4 is a generalized schematic block diagram of portions of the illustrative user television equipment of FIG. 3 in accordance with one embodiment of the present invention.

A more generalized embodiment of user television equipment 220 of FIG. 3 is shown in FIG. 4. As shown in FIG. 4, program guide data from program guide distribution facility 160 (FIG. 1) is received by control circuitry 420 of user television equipment 220. The functions of control circuitry 420 may be provided using the set-top box arrangement of FIGS. 2a and 2b. Alternatively, these functions may be integrated into an advanced television receiver, personal computer television (PC/TV), or any other suitable arrangement. If desired, a combination of such arrangements may be used.

User television equipment 220 may also have secondary storage device 470 and digital storage device 490 for recording programming. Secondary storage device 470 can be any suitable type of analog or digital program storage device (e.g., a videocassette recorder, a digital versatile disc recorder (DVD), etc.). Program recording and other features may be controlled by control circuitry 420. Digital storage device 490 may be, for example, a writeable optical storage device (such as a DVD recorder capable of handling recordable DVD discs), a magnetic storage device (such as a disk drive or a digital tape drive), or any other digital storage device.

User television equipment 220 may also have memory 630. Memory 630 may be any memory or other storage device, such as a random access memory (RAM), read only memory (ROM), flash memory, a hard disk drive, a combination of such devices, etc., that is suitable for storing program guide application instructions and program guide data for use by control circuitry 420.

User television equipment 220 of FIG. 4 may also have communications device 511 for supporting communications between the program guide and distribution equipment 210, program guide server 250, of Internet service system 610 via communications path 200. Communications device 511 may be a modem (e.g., any suitable analog or digital standard, cellular, or cable modem), network interface card (e.g., an Ethernet card, Token ring card, etc.), or other suitable communications device (e.g., a modulator, a remodulator, or media may be transmitting within the vertical blanking interval (VBI) of an analog channel or within a data track or a digital channel.

A user may control the operation of user television equipment 220 with user input device 460. User input device 460 may be a pointing device, wireless remote control, keyboard, touch-pad, voice recognition system, or any other suitable user input device. To access media, a user instructs processing circuitry 420 to display a desired television channel or other media source on display device 450. In another embodiment, it may also output audio data on audio output device 451. Display device 450 may be any suitable television monitor, or other suitable display device. Audio output device may be any suitable media speaker, or other suitable audio output device. To access the functions of the program guide, a user instructs the program guide implemented on interactive television program guide equipment 170 to generate a main menu or other desired program guide display screen for display on display device 450.

Figure 5A:
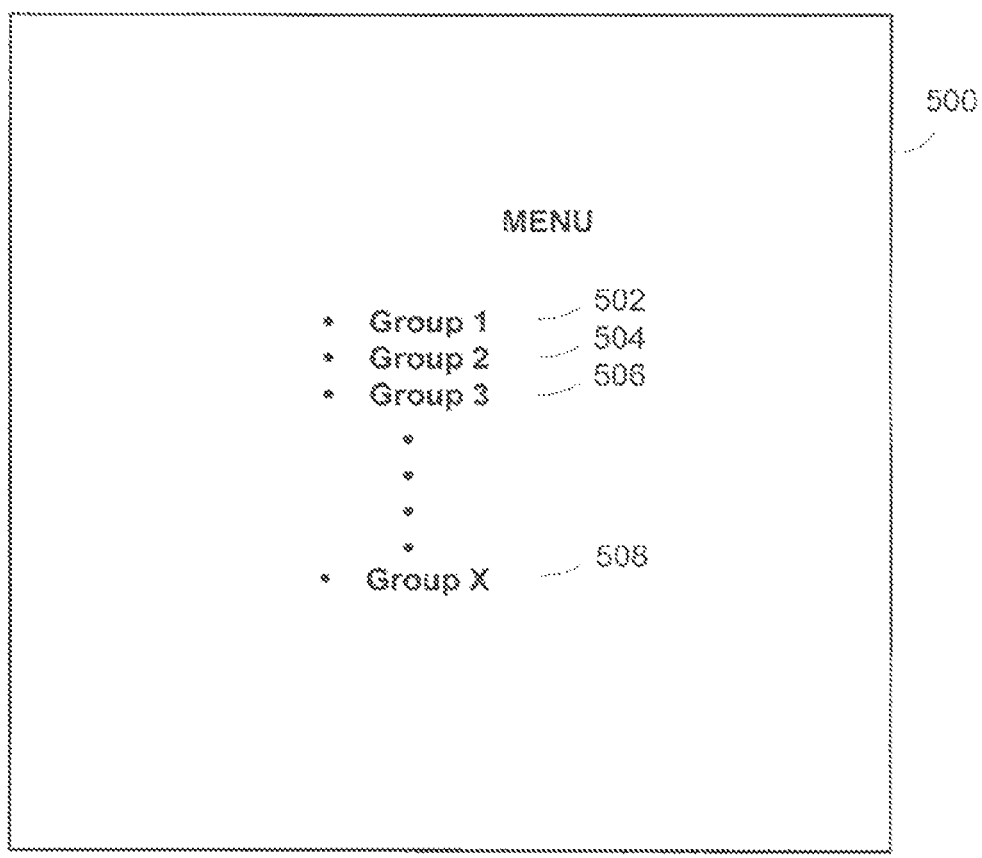
FIG. 5a shows an illustrative display template of an interactive media guide in accordance with an embodiment of the present invention.

FIG. 5a depicts an illustrative display template 500 of an interactive media guide according to an embodiment of the present invention. Display template 500 includes groups 502, 504, 506, 508. In some embodiments, the groups may be designed to indicate media that the user may be interested in, without indicating the content (e.g., the criteria for including media in a group may be arbitrary, user-defined, predefined, or any other suitable criteria), titles, or source of the media. One or more of the groups shown in FIG. 5a may be deleted if desired or other groups may be added if desired. Moreover, the groups may be user configurable, or may be pre-defined.

Figure 5B:
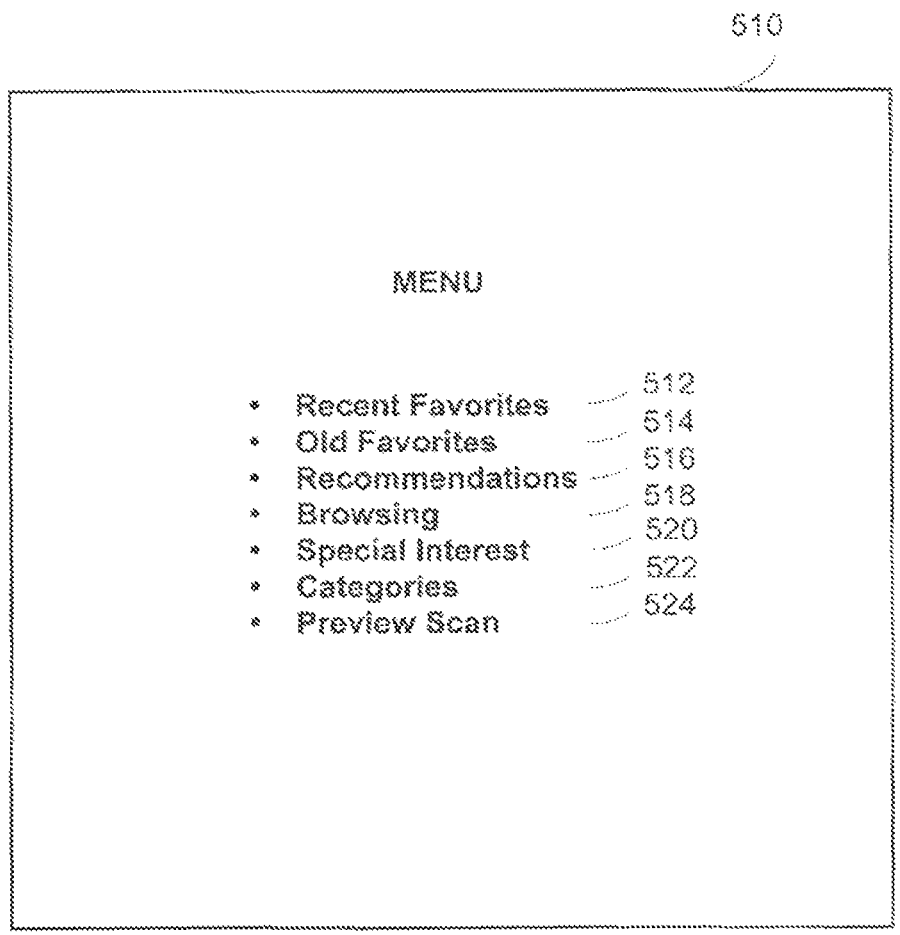
FIG. 5b shows an illustrative display of an interactive media guide displaying groups that indicate media without indicating the content, title, or source of the media in accordance with an embodiment of the present invention.

FIG. 5b depicts an illustrative arrangement of the groups of FIG. 5a. The menu screen of FIG. 5b provides the user with opportunities to view "what's on now" for media within one or more groups. In the embodiment in FIG. 5b, the groups are configured to relate to Recent Favorites 512, Old Favorites 514, Recommendations 516, Browsing 518, Special Interest 520, Categories 522, and Preview Scan 524. These groups are meant only to be illustrative. Other types of groups may be provided.

In response to a user selecting Recent Favorites 512, the interactive media guide may indicate to the user media available on demand that meet criteria that meet favorites parameters set up by the user, media with characteristics similar to the characteristics of recently reviewed or recorded media, or any suitable combination thereof. The interactive media guide may also provide a list of media that a user may select, which, upon selecting, the user may be given the opportunity to view the media, buy the media, set a reminder to view the media, or add attributes of the media to a user profile, or perform any suitable action with respect to the media. Recent favorites 512 may also indicate any recently recorded media, recently recorded media that meets user favorites parameters, or any suitable combination thereof. The recently recorded media may have been recorded by the user's home equipment or by a server remote to the user's home. Any suitable combination of these approaches may also be used.

In response to a user selecting Old Favorites 514 from the main menu, the interactive media guide may indicate to the user previously recorded media that meets user favorites, media that have characteristics similar to recently reviewed or recorded media, video on demand, or any suitable combination thereof. The interactive media guide may also provide a list of media that a user may select, which, upon selecting, the user may be given the opportunity to view the media, buy the media, set a reminder to view the media, or add attributes of the media to a user profile, or perform any suitable action with respect to the media. Previously recorded media may have been recorded in accordance with the user's desires (i.e., in response to the user indicating a desire that the user wants particular media or media with certain characteristics recorded). The media may be recorded on the user's home equipment or on a server remote to the user's home. In another suitable approach, a server may record media automatically and provide old favorites available to the user for the user's review via the interactive media guide. Any suitable combination of these approaches may also be used.

In response to the user selecting Recommendations 516 from the main menu 510, the interactive media guide may indicate to the user recommended available media, previously recorded media, media on demand, or any suitable combination. The media may be currently distributed or previously recorded. The interactive media guide may also provide a list of media that a user may select, which, upon selecting, the user may be given the opportunity to view the media, buy the media, set a reminder to view the media, or add attributes of the media to a user profile, or perform any suitable action with respect to the media. A recommended media 516 may be recommended to the user using any suitable approach. Programs may be recommended based on, for example, user preferences or favorites. Programs may also be editorially recommended. The interactive media guide provider may, for example, provide reviews or recommendations from personnel at the service provider. Recommendations may also be promotional or informational (e.g., sponsored advertisements, infomercials, etc.).

In response to a user selecting Browsing 518 from the main menu, the interactive media guide may provide the user with an opportunity to browse listings for media that is currently available. The media may be currently distributed media, or media that has been prerecorded and is available to users on demand from their in-home equipment or a remote server (e.g., guide server, Internet server, etc.). The interactive media guide may also provide a list of media that a user may select, which, upon selecting, the user may be given the opportunity to view the media, buy the media, set a reminder to view the media, or add attributes of the media to a user profile, or perform any suitable action with respect to the media.

Listings may be browsed using any suitable approach. Listings may, for example, be organized by time, channel, genre, or any other suitable parameter. If desired, the interactive media guide may provide users with an opportunity to specify the characteristics for which listings are presented. If desired, one or more listing may be presented with a full or partial screen video of the currently selected (e.g., highlighted) listing. If desired, the video may be displayed along with media the user is currently viewing. The video may be, for example, of the portion of the media currently available (i.e., the point at which it is currently distributed), a predefined portion of the media (e.g., the first twenty seconds), or a trailer or other clip that is supplied to the interactive media guide. For audio media, a graphic associated with the audio may be displayed while an audio clip for the audio is played if desired.

In response to the user selecting Special Interest 520 from the main menu, the interactive media guide may provide the user with an opportunity to review listings for media that are of special interest to the user. Media may be determined to be special interest media using any suitable approach. The interactive media guide may also provide a list of media that a user may select, which, upon selecting, the user may be given the opportunity to view the media, buy the media, set a reminder to view the media, or add attributes of the media to a user profile, or perform any suitable action with respect to the media. The interactive media guide may, for example, allow the user to select or define special interest categories. In another approach, the interactive media guide provider or the application may select special interest categories. The interactive media guide provider may, for example, decide to feature particular types of media in a given month. Any other suitable approach may also be used.

In response to the user selecting Categories 522 from the main menu, the interactive media guide may provide the user with an opportunity to select one or more categories of media for which the user wishes to access media listings. The interactive media guide may also provide a list of media that a user may select, which, upon selecting, the user may be given the opportunity to view the media, buy the media, set a reminder to view the media, or add attributes of the media to a user profile, or perform any suitable action with respect to the media. The categories may be user selected (e.g., from a setup screen), user defined, system selected, or defined or selected using any other suitable approach. In response to, for example, the user selecting a group from categories presented by the interactive media guide, the interactive media guide may provide the user with media listings for currently distributed or recorded media in the selected group or categories.

In response to the user selecting Preview Scan 524, the interactive media guide may provide the user with an opportunity to scan previews of currently available media. The interactive media guide may also provide a list of media that a user may select, which, upon selecting, the user may be given the opportunity to view the media, buy the media, set a reminder to view the media, or add attributes of the media to a user profile, or perform any suitable action with respect to the media. Currently available media may include any media currently distributed to the user's equipment, or media previously recorded by the user's equipment or stored on a server remote to the user's home. Previews for the media may include video or audio clips associated with the media.

The video and audio clips may be provided to the interactive media guide using any suitable approach. Clips may be provided along with the media as, for example, digital files within the vertical blanking interval (VBI) of an analog channel or within a data track on a digital channel. Clips may be provided separately from the media to an interactive media guide running at least partially on the user's home equipment, using any suitable approach. Clips may be, for example, provided to the application on demand from a media source. Clips may be provided as, for example, part of data supplied to the interactive media guide, using a continuous stream, periodic download, periodic polling, or any other suitable approach. Previews may also be the current portion of currently distributed media, or a predefined portion of media, if desired. The preview clips may be presented to the user using any suitable approach. The interactive media guide may, for example, provide the user with an opportunity to select previews from media listings. In another suitable approach, previews may be provided using a passive scan. The interactive media guide may cycle through previews until the user indicates a desire to access media or exit the scan. The interactive media guide may provide users with opportunities to skip a preview and access a subsequent preview, if desired.

Figure 5C:
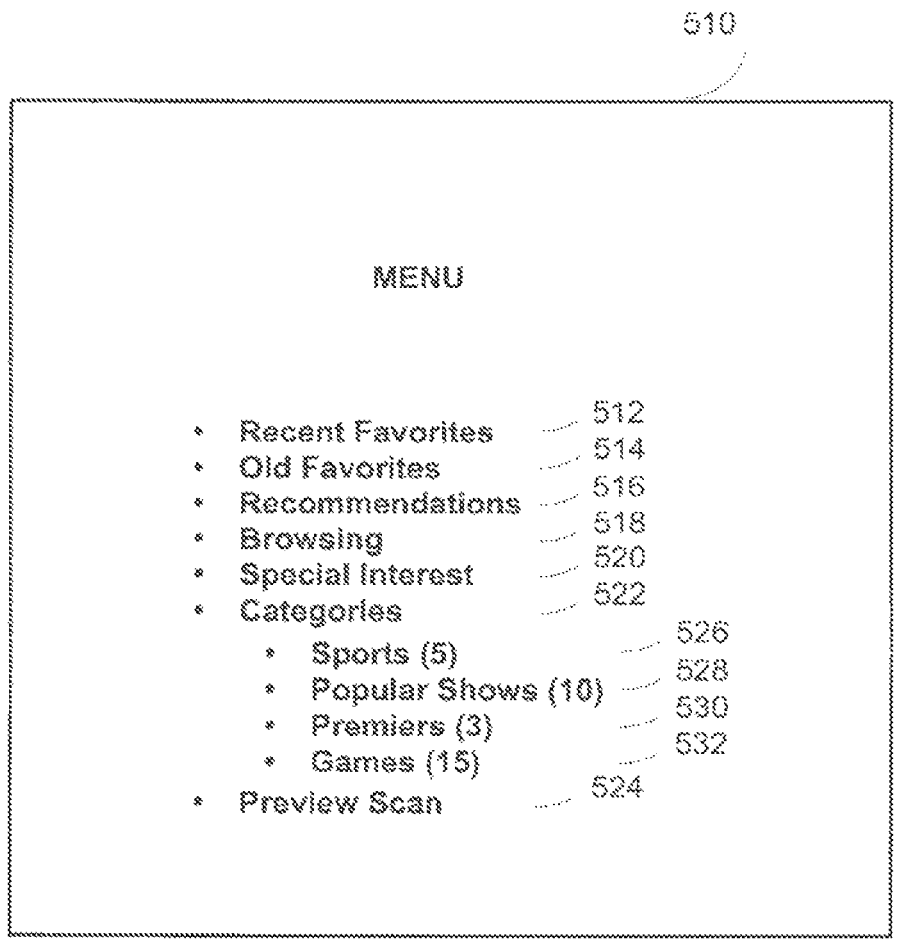
FIG. 5c shows an illustrative display of an interactive media guide displaying sub-groups in accordance with an embodiment of the present invention.

Once a user selects a particular group (e.g., 512, 514, 516, 518, 520, 522, 524), the user may also be presented with a plurality of sub-groups. FIG. 5c depicts an interactive media guide in which category group 522 is expanded to display sub-groups sports 526, popular shows 528, premiers 530, and games 532. In parentheses after each sub-group, the interactive media guide of FIG. 5c indicates how many media titles are available for the given sub-group. For example, there are five sports media titles available in the sports sub-group 526.

Figure 6:
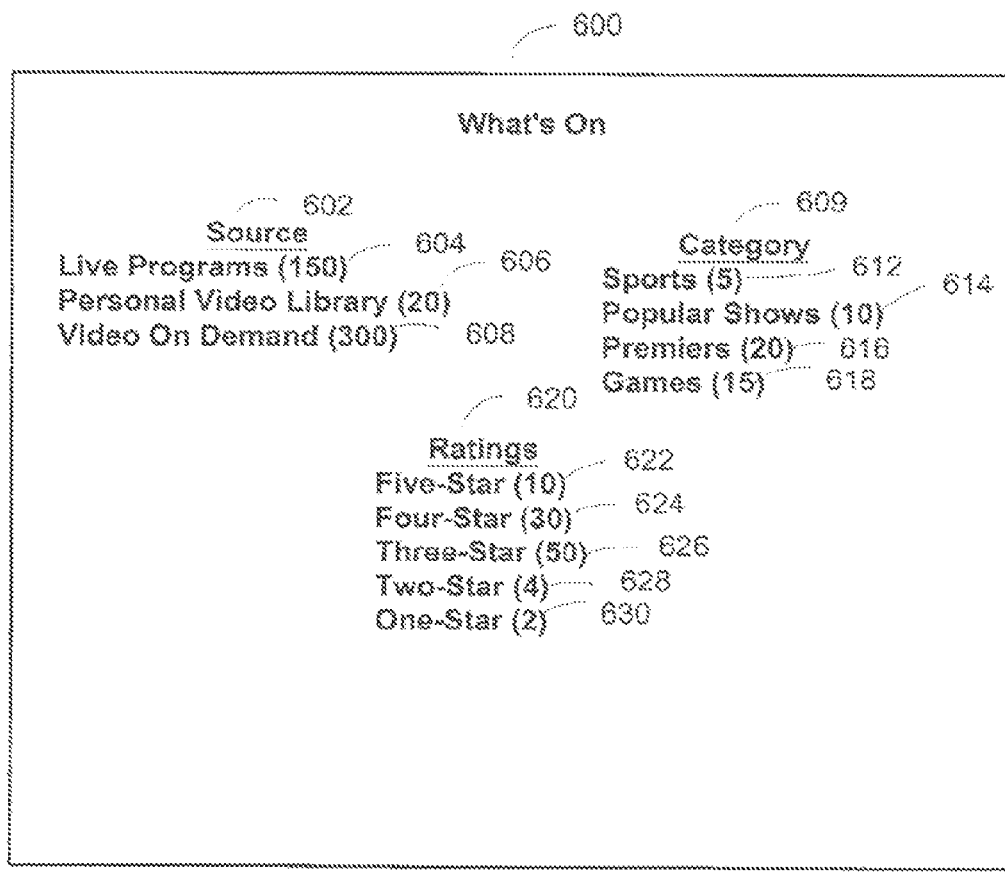
FIG. 6 shows an illustrative display of an interactive media guide displaying groups that may indicate media by indicating the content, title, or source of the media in accordance with an embodiment of the present invention.

FIG. 6 depicts an illustrative What's On screen 600 that the interactive media guide may provide to the user to indicate currently available media with minimal information. The What's On screen of FIG. 6 may be used as a main menu screen, or in conjunction with a main menu screen such as the main menu screen of FIG. 5b. For example, in response to a user selecting a menu selection from the menu of FIG. 5b, the interactive media guide may present the What's On screen of FIG. 6 to indicate the number of media listings of media or available previews, in accordance with the selected menu selection.

The What's On screen 600 of FIG. 6 indicates to the user the number of available media selections for any suitable types and groups of media, as indicated in parenthesis. In the example of FIG. 6, three groups of available media selections indicated: Source 602, Category 609, and Ratings 620. Source may indicate available media by source, such as available live media (e.g., programs) 604, media recorded by the user 606, on-demand programs (e.g., video-on-demand or audio-on-demand) 608, or any other suitable source type. Category 609 may indicate available media for any suitable category such as, for example, sports 612, popular shows 614, premiers 616, or games 618. Ratings 620 may indicate available media of different editorial ratings, such as five-start 622, four-star 624, three-star 626, two-star 628, or one-star media 630.

Groups and sub-groups may be included in screens using any suitable approach. Groups and sub-groups may be user-configurable. Groups and sub-groups may be programmed into the interactive media guide. In still another suitable approach, groups and sub-groups (and the menu selections of FIG. 5b if desired) may be dynamically selected by the interactive media guide based on what is available, thereby providing the user with dynamic guidance.

Figure 7A:
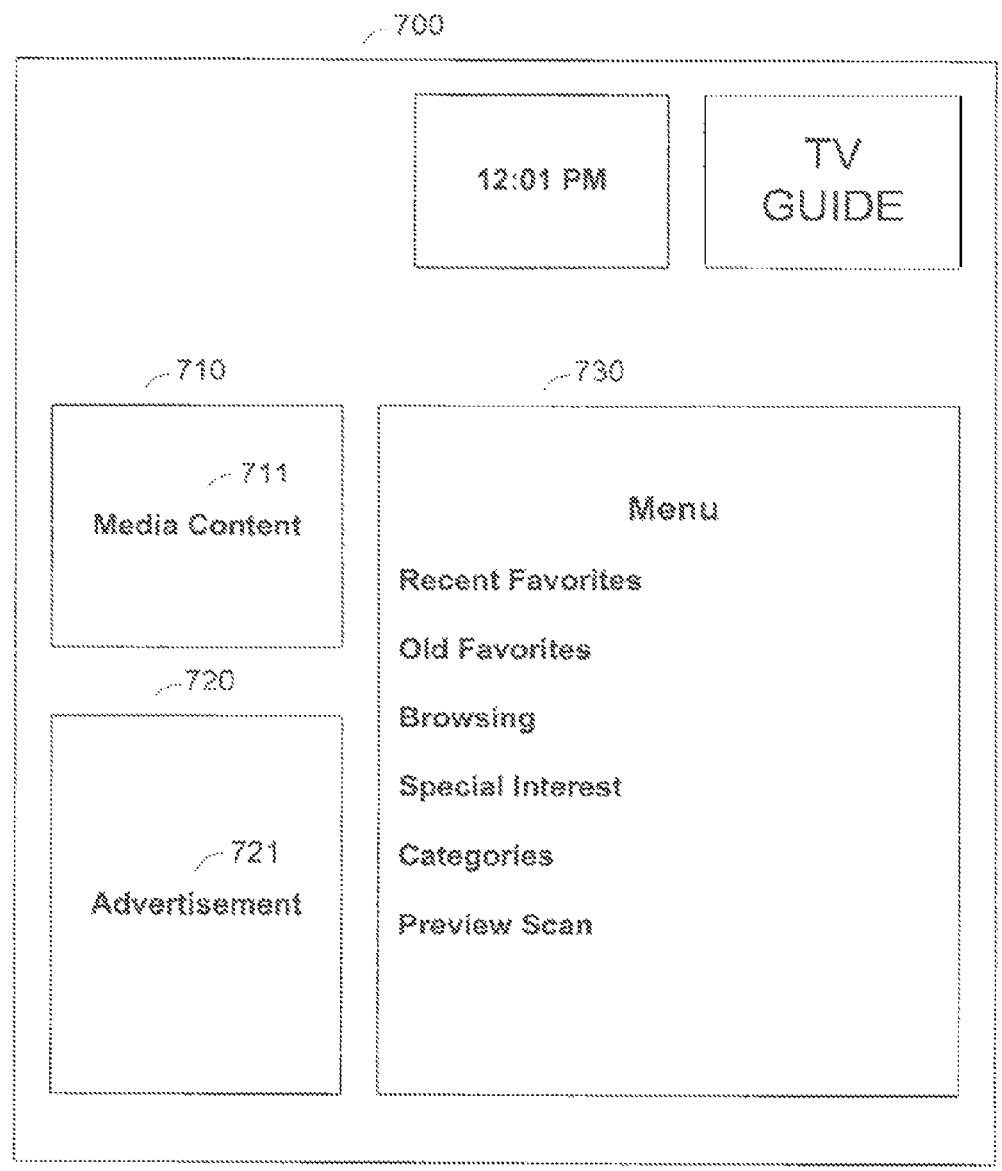
FIG. 7a shows an illustrative interface display of an interactive media guide displaying groups that indicate media without indicating the content, title, or source of the media in accordance with an embodiment of the present invention.

FIG. 7a shows another illustrative display arrangement for displaying groups that indicate media without indicating the title, content (e.g., the criteria for including media in a group may be arbitrary, user-defined, predefined, or any other suitable combination), or source of the media. Screen 700 may be displayed when a user first invokes the program guide and may be generated in any suitable manner. For example, screen 700 may be generated by the program guide from data downloaded from a remote site by any suitable means. Screen 700 may also be downloaded as an HTML document from a remote web server and displayed as a web page. Screen 700 may contain text, graphics, animations, video, any other suitable content, or any suitable combination thereof.

Screen 700 may contain picture-in-guide window 710 that contains media content 711 for the media currently being viewed (e.g., it may display media for the program on the channel to which the set-top box is currently tuned), media to be viewed in the future (e.g., a trailer for VOD media), or any other suitable media. Screen 700 may include interactive or passive advertisement window 720, which may display advertisement 721. Advertisement 720 may be any suitable passive or interactive graphic, text, video, or other advertisement for a program, product, or service. For example, a title or advertisement of a movie currently playing may be an advertisement. As another example, a third party may provide an interactive advertisement of a particular product. If a user desires additional information regarding the product, the user may indicate this desire by clicking or selecting the advertisement 720. Thereafter, the user may be provided with additional information regarding the advertised product. This additional information may be in any suitable form; it may be provided as a static or interactive advertisement, or, for example may be a web page associated with the advertised product. The menu 730 may be any of the aforementioned interactive media guides; for example, it may be any of the media guides shown in FIG. 5a-6.

Figure 7B:
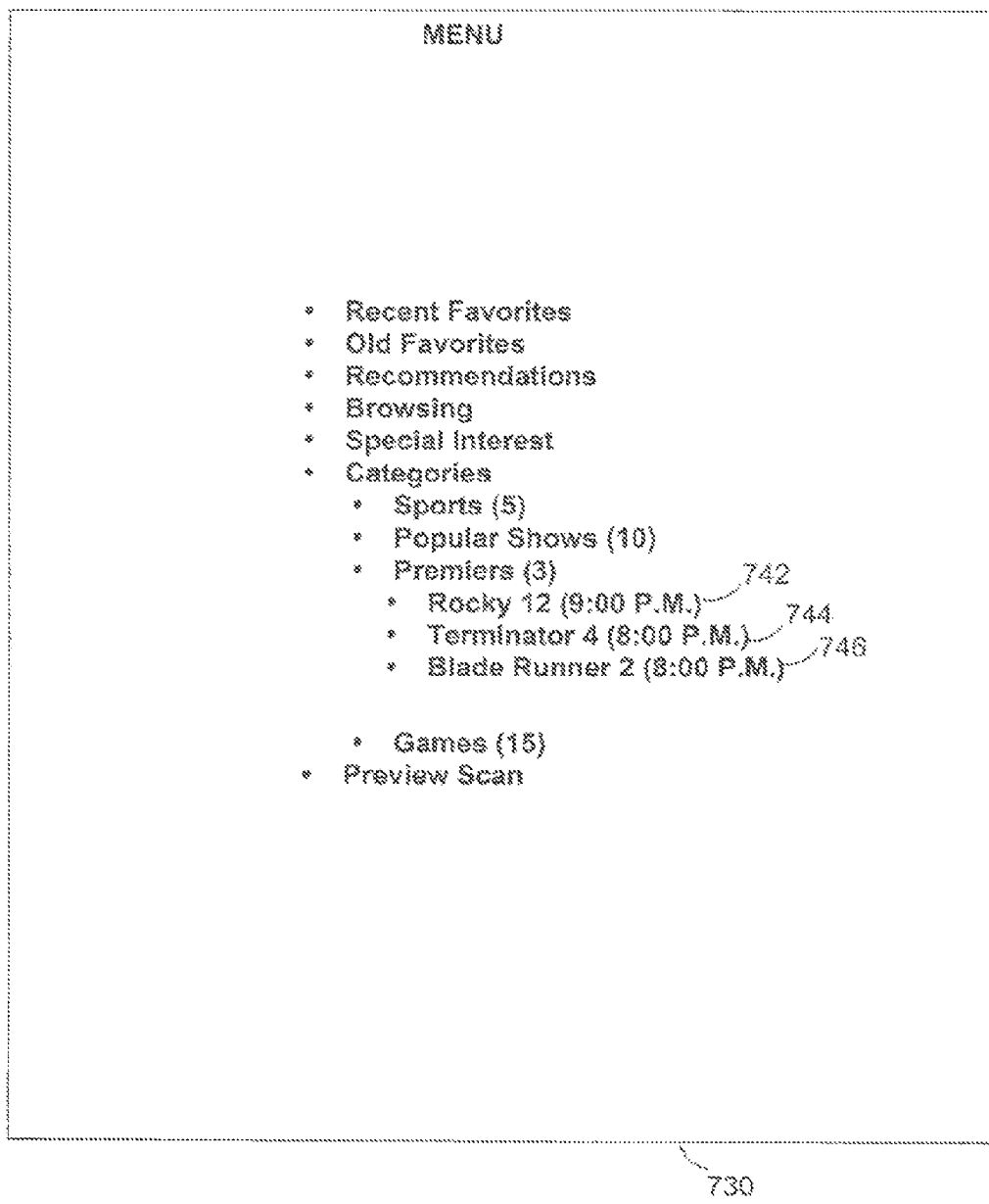
FIG. 7b shows an illustrative display of an interactive media guide displaying media titles in accordance with an embodiment of the present invention.
Figure 7C:
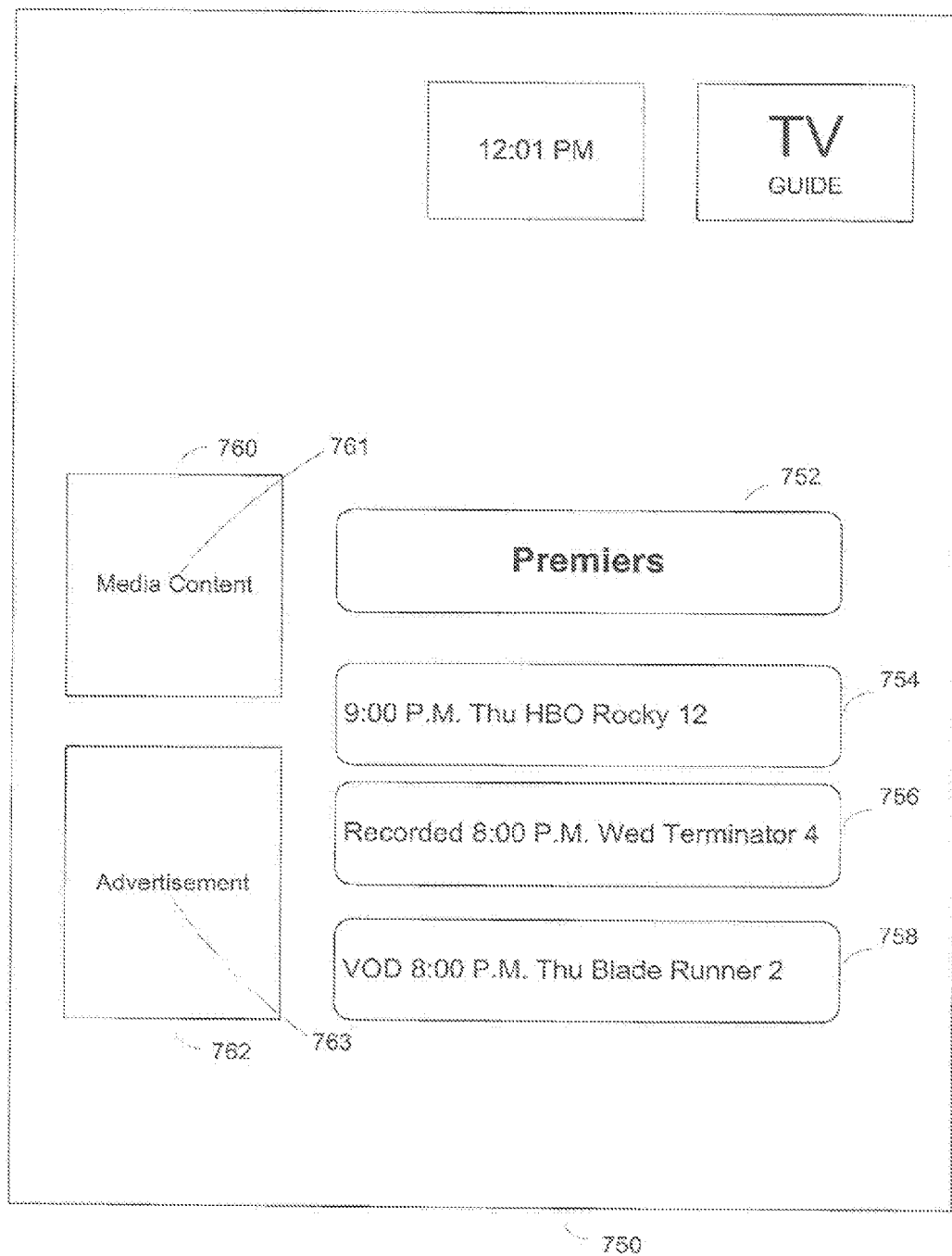
FIG. 7c shows an illustrative display of an interactive media guide displaying media titles in accordance with an embodiment of the present invention.

In response to a user selecting a group or sub-group, the interactive media guide may provide the user with media listings in accordance with the user's selection. Media listings may be provided by time, by channel, or using any other suitable approach. For example, FIG. 7b depicts another embodiment of menu 730 of FIG. 7a. FIG. 7b depicts media selections 742, 744, and 746 that are available in the premiers sub-group. In another embodiment, in response to a user selecting a group or sub-group, menu 750 of FIG. 7c may be displayed. Menu 750 may contain picture-in-guide window 760 that contains media content 761 for the media currently being viewed (e.g., it may display media for the program on the channel to which the set-top box is currently tuned), a preview of the media that the user has selected, or any other suitable media. For example, if the user has selected media listing 754, a trailer or advertisement may be displayed for that media listing in picture-in-guide window 760. Menu 750 may also indicate interactive or passive advertisements 763 in advertisement window 762. Menu 750 may also display the selected group or sub-group 752, and the media listings associated with that group or sub-group, 754, 756, and 758. Media listings 754, 756, and 758 may be provided from a variety of sources. For example, media listing 754 may be a broadcast media listing. Media listing 756 may be a locally stored media listing, and media listing 758 may be a video on demand media listing. Upon selecting the desired media listing, the user may be given the opportunity to view the media, buy the media, set a reminder to view the media, or add attributes of the media to a user profile, or perform any suitable actions with respect to the media. For example, the menu 750 may be replaced with a full screen display of the selected media.

Figure 8A:
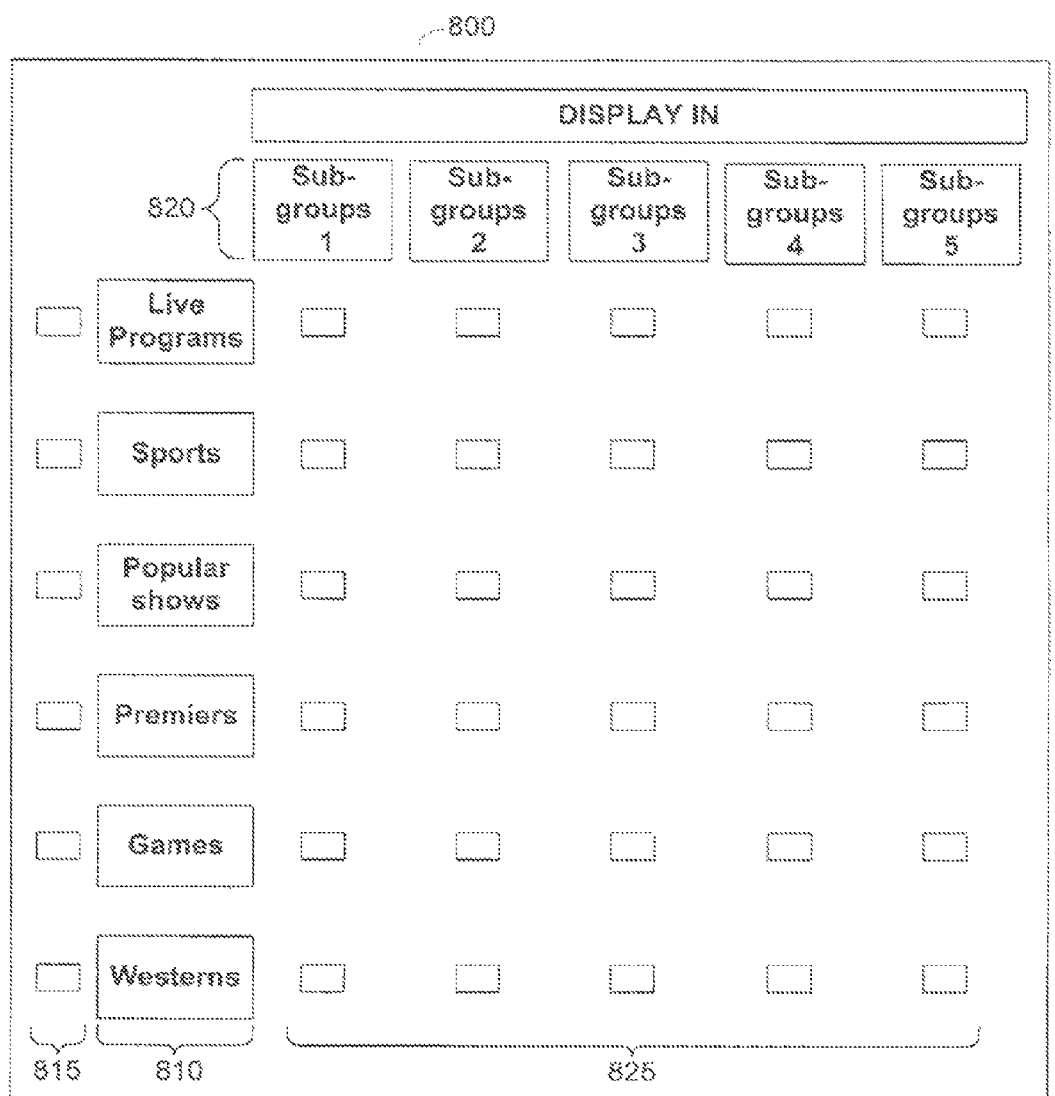
FIG. 8a shows an illustrative setup screen that allows a user to configure the groups displayed in an interactive media guide in accordance with an embodiment of the present invention.

In some embodiments, a user may personalize the groups according to the user's tastes. This may be accomplished in a variety of ways. A user may be provided with a plurality of groups to choose from, and may be given the opportunity to determine which sub-groups, if any, should be displayed under the selected groups. For example, FIG. 8a depicts a setup screen that may allow a user to configure the groups according to the user's personal tastes. Setup display 800 may contain groups 810. A user may select which groups the user would like to have displayed by, for example, selecting the appropriate check box from check boxes 815. The user may also select one or more sub-groups 820 which should be displayed under the selected group by, for example, checking the appropriate check box from the check boxy grid 825 under the appropriate sub-group. The sub-groups 820 may be predefined, or the user may be given the opportunity to enter text into the category subgroups fields 820 to be displayed.

Figure 8B:
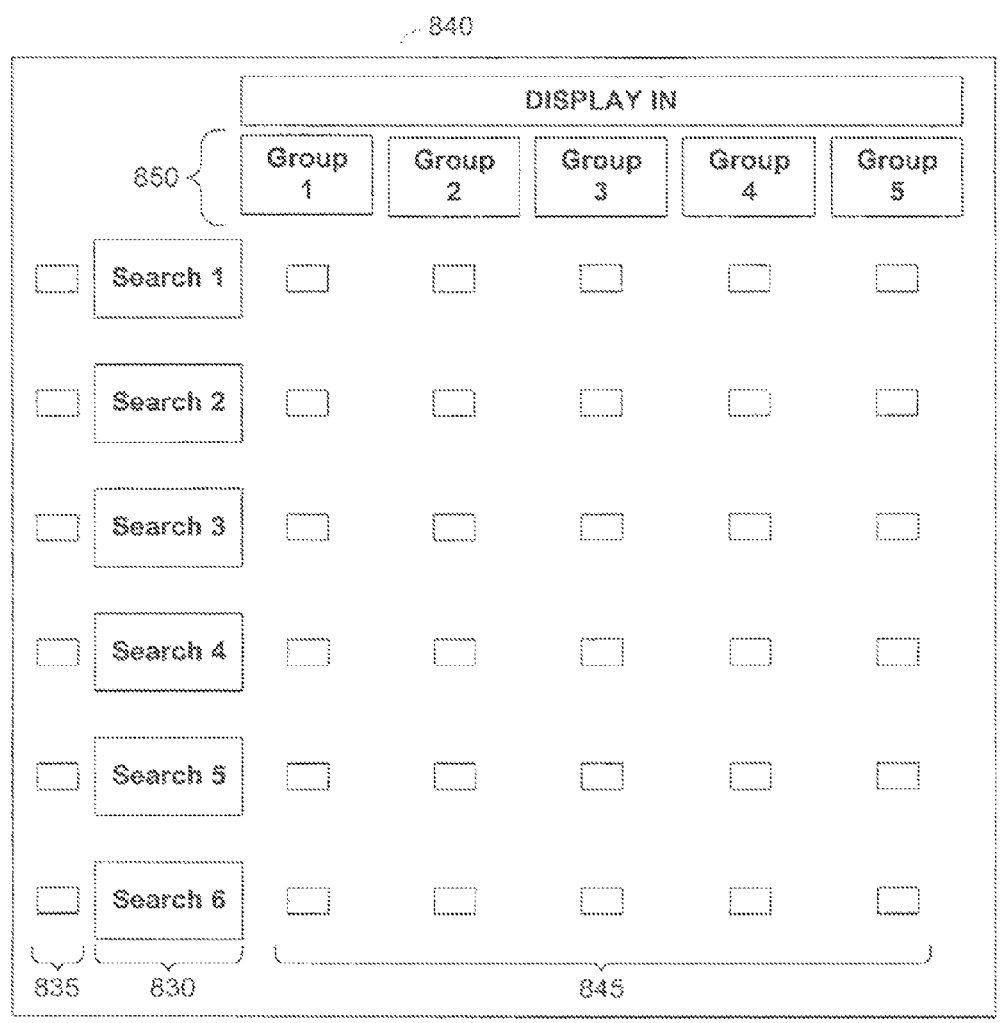
FIG. 8b shows an illustrative setup screen that allows a user to configure the groups displayed in an interactive media guide in accordance with an embodiment of the present invention.
Figure 8C:
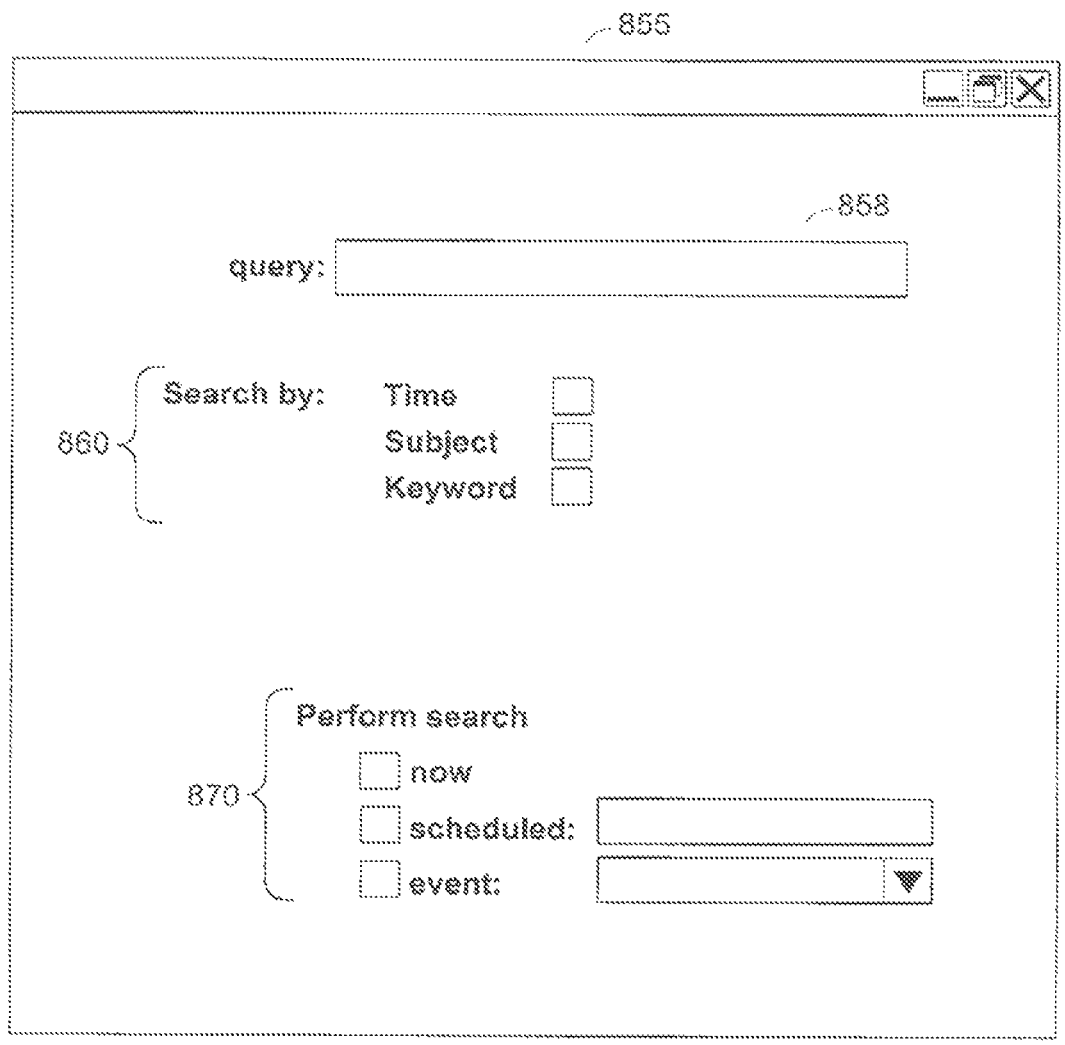
FIG. 8c shows an illustrative display screen for entering a search query in accordance with an embodiment of the present invention.

In some embodiments, users may be given the opportunity to dynamically create the media guide menu screen. In FIG. 8b, a user may be given the opportunity to enter one or more searches 830 defined by the user and saved by the interactive media guide. The user may also select one or more groups 850 under which the results of the selected searches may be displayed. Upon indicating a desire to enter a search by selecting an appropriate check box 835, a user may be given an opportunity to name the search string (e.g., "Rich's Favorites"). The user may also be given the opportunity to enter a search string. The search string may be a boolean search string, natural language search string or any other suitable search string. FIG. 8c illustrates an example display 855 that may be presented to the user, when the user indicates a desire to enter a search string. The user may enter a search string in query box 858. To further refine the search, the user may select one or more search criteria 860 to apply the search to. These criteria may include, for example, program time, the program subject, or key word search. Thereafter, upon entering the menu screen, the guide will perform the search entered by the user, and will display only those user-defined groups 850 that contain programs that meet the search criteria. A user may also be given the opportunity to determine when the search should be performed, by selecting the appropriate check box from search criteria field 870. For example, a user may select to have the search executed immediately, at a schedule time (e.g., at 9:00 am, or every hour), or at the occurrence of a specified event (e.g., whenever a group or sub-group is selected, the ending of a specified program, or any other suitable event).

Figure 9A:
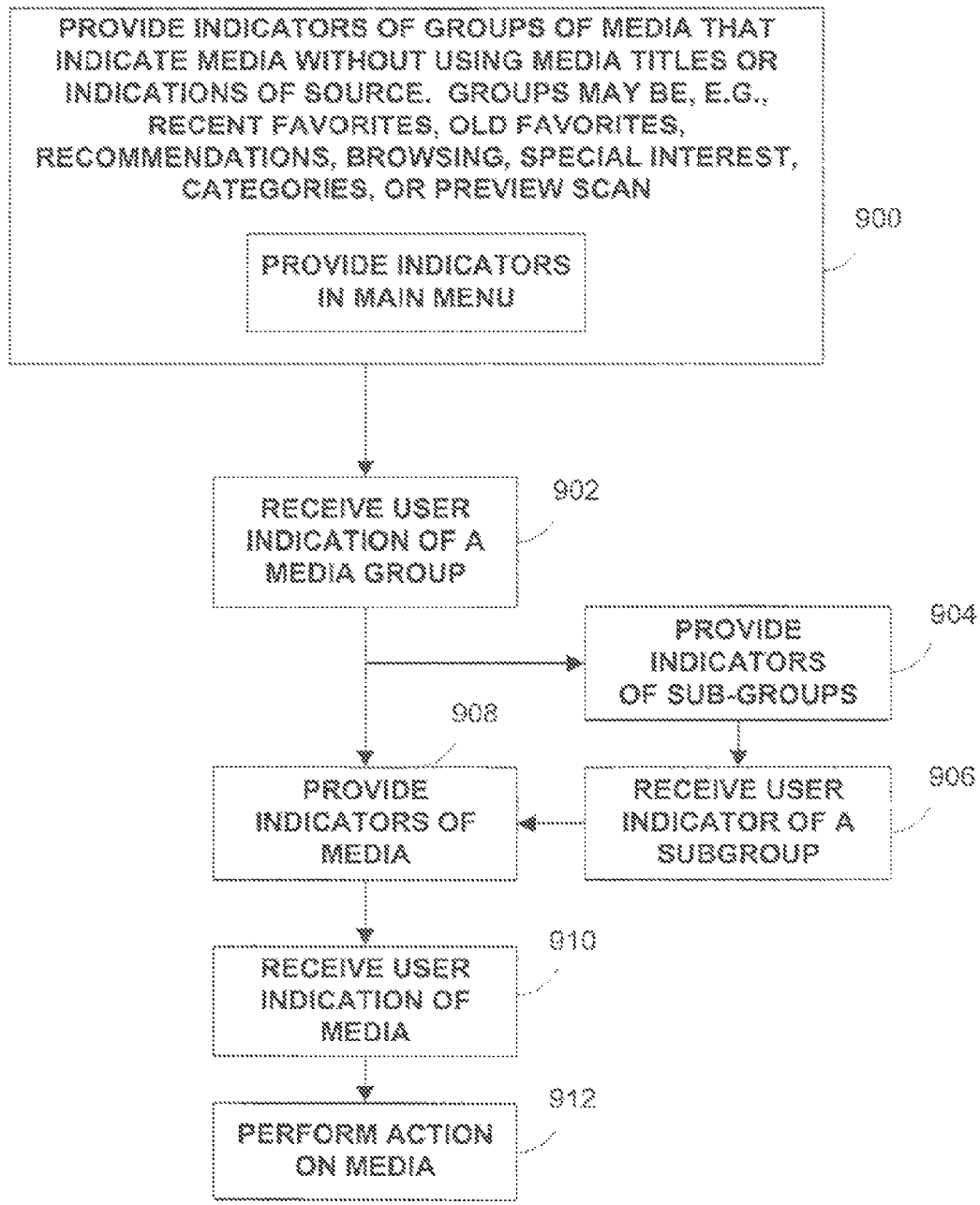
FIG. 9a is a flowchart of illustrative steps involved in creating and displaying an interactive media guide in accordance with an embodiment of the present invention.

FIG. 9a is a flowchart of illustrative steps involved in creating and displaying an interactive media guide according to an embodiment of the present invention. In step 900, indicators are provided in the main menu by providing indicators of groups of media that are available to the user are provided. The groups may, for example, indicate media without indicating the title, source or content (e.g., the criteria for including media in a group may be arbitrary, user-defined, predefined, or any other suitable criteria) of media. Illustrative groups include, for example, recent favorites, old favorites, recommendations, browsing, special interest, categories, preview scan, or any other suitable category. In step 902, the user indication of a desired media group may be received by, for example, interactive television program guide equipment 170 of FIG. 1 (e.g., groups 512, 514, 516, 518, 520, 522, or 524 of FIG. 5b). The user may then be provided with an indication of available media, in step 908. In one embodiment (not shown), the user may be provided with an indication of available media listings displayed by time, and, in the same list, media that includes media that are scheduled by time media that are available but are without a scheduled time. In another embodiment, the user may be provided with indicators of available sub-groups, in step 904 (e.g., sub-groups 526, 528, 530, 532 of FIG. 5c). The user indication of a desired media sub-group may be received in step 906. In step 908, the user may then be provided with indicators of available media.

Upon being presented with indicators of available media, the user indication of desired media may be received in step 910. In response to this indication, a user may be given the opportunity to perform a suitable action on the media, in step 912. The user may be given the opportunity to view the media, buy the media, set a reminder to view the media, or add attributes of the media to a user profile, or perform any suitable actions with respect to the media. In one example, the current displayed screen may be replaced with a full-screen display of the selected media or content.

Figure 9B:
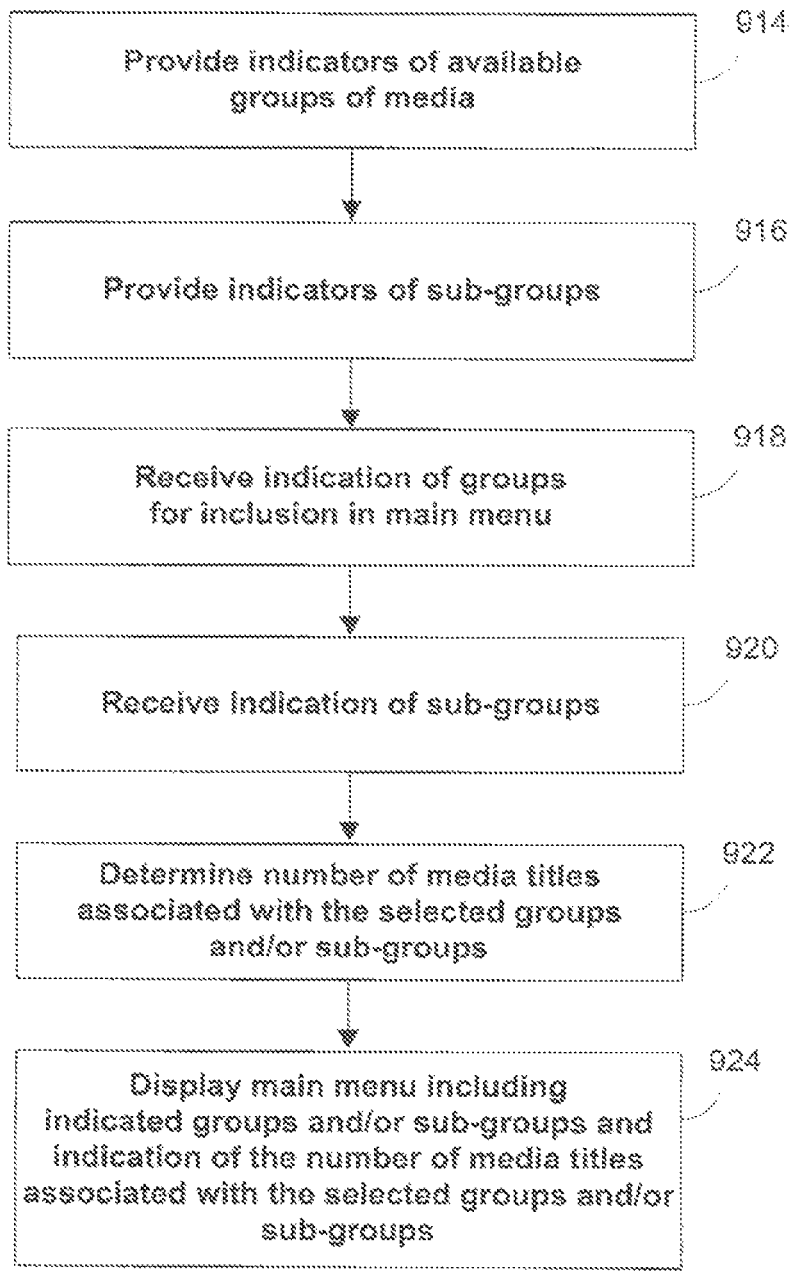
FIG. 9b is a flowchart of illustrative steps involved in configuring an interactive media guide according to a user's preferences in accordance with an embodiment of the present invention.

FIG. 9b is a flowchart of illustrative steps involved in configuring a menu screen according to a user's preferences. In step 914, the user may be provided with indicators of available groups of media (e.g., the user may be presented with the media groups 810 of FIG. 8a). In step 916, the user may be provided with indicators of sub-groups, e.g., the sub-groups 820 of FIG. 8a. These sub-groups may be predefined, or the user may be given an opportunity to enter the user's own sub-groups. In step 918, the user indication of groups to be displayed for inclusion in the main menu may be received by, for example, interactive television guide equipment 170 of FIG. 1 (e.g., by selecting one or more check boxes from check boxes 815 of FIG. 8a). In step 920, the user indication of sub-groups to be displayed under the selected groups may be received (e.g., by selecting the appropriate check boxes from check box grid 825). In step 922, it may be determined how many media titles are available that are associated with the selected groups and sub-groups. In step 924, the user-defined menu screen may be displayed, including the indicated group, sub-groups, and the number of available media titles associated with those groups and sub-groups.

Figure 9C:
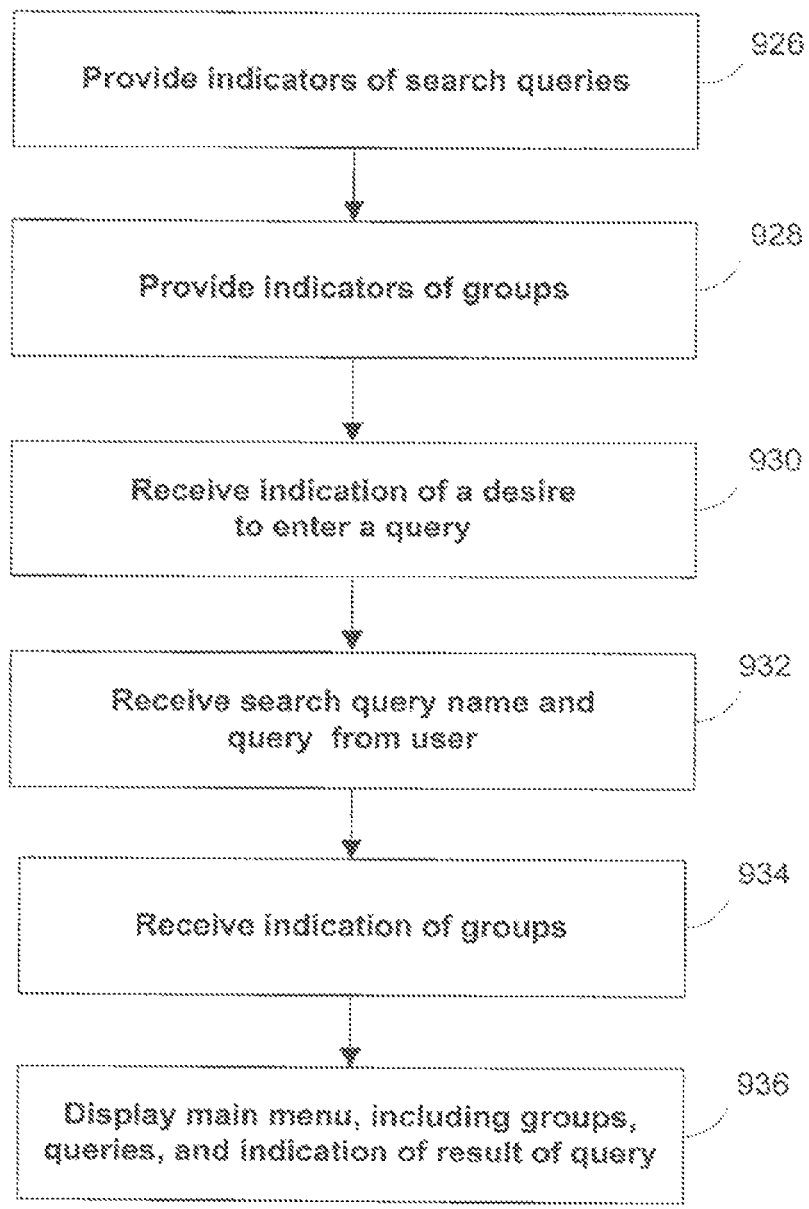
FIG. 9c is a flowchart of illustrative steps involved in configuring an interactive media guide according to a user's preferences in accordance with an embodiment of the present invention.

FIG. 9c is a flowchart of illustrative steps involved in configuring a menu screen according to a user's preferences. In step 926, the user may be provided with indicators of available user-defined search queries (e.g., the search queries 830 of FIG. 8b). In step 928, the user may be provided with indicators of available groups, e.g., the groups 850 of FIG. 8b. In step 930, the user's indication to enter a query may be received by, for example, interactive television guide equipment 170 of FIG. 1 (e.g., by selecting one or more check boxes from check boxes 835 of FIG. 8b). Queries may be scheduled to run periodically (e.g., every hour), upon the occurrence of an event (e.g., if a program ends) or on demand. Upon indicating a desire to enter a query, the user may be given the opportunity to name the search query (e.g., "sports", or "Rich's Favorites"), and to enter a search string that will be associated with the named search query is step 932 (e.g., FIG. 8c).

In step 934, the user's indication of which groups the results of the queries should be displayed in may be received (e.g., by selecting the appropriate check boxes from check grid 845). If the user does not indicate any groups, than the search query may be displayed as an individual group. In step 836, the user-defined menu screen may be displayed, indicating the groups, sub-groups, and the results of the search query (i.e., the number of media titles that matched the search query).

Thus, systems and methods for providing guidance to users for finding media provided by different media sources is provided. One skilled in the art will appreciate that the present invention can be practiced by other than the described embodiments, which are presented for illustration and not of limitation, and the present invention is limited only by the claims that follow.

What is claimed is:

1. A method for presenting media to a user, the method comprising:
    generating for display one or more media group options, wherein the media group options indicate media available to the user without indicating any of the content, title, or source of the media;
    generating for display a plurality of media indicators associated with a selected media group option, wherein:
        the plurality of media indicators identify media provided by at least one of a plurality of media sources, and
        the plurality of media indicators includes a first media indicator for media available at a scheduled time and a second media indicator for media available without a scheduled time; and
    in response to receiving a selection of a media indicator from the plurality of media indicators, performing an action associated with the selected media indicator.

2. The method of claim 1, wherein providing the one or more media group options further comprises indicating the number of presently available media that are associated with a media group option.

3. The method of claim 1, wherein the one or more media group options are user-defined.

4. The method of claim 3, wherein user-defined media group options comprise media indicators that meet a user-defined criteria.

5. The method of claim 4, wherein the user-defined criteria is a user-defined search.

6. The method of claim 1, further comprising generating for display a media sub-group option associated with a media group option, wherein at least one of the plurality of media indicators is associated with the media sub-group option.

7. The method of claim 6, further comprising indicating the number of media indicators that are associated with the media sub-group option.

8. The method of claim 1, further comprising receiving a selection of a media group option from a user.

9. The method of claim 1, wherein the selection of a media indicator is received from a user.

10. The method of claim 1, wherein the action comprises presenting media that is identified by the selected media indicator in response to the media indicator selection.

11. A system for presenting media to a user, the system comprising processing circuitry configured to:
    generate for display one or more media group options, wherein the media group options indicate media available to the user without indicating any of the content, title, or source of the media;
    generate for display a plurality of media indicators associated with a selected media group option, wherein:
        the plurality of media indicators identify media provided by at least one of a plurality of media sources, and the plurality of media indicators includes a first media indicator for media available at a scheduled time and a second media indicator for media available without a scheduled time; and perform, in response to receiving a selection of a media indicator from the plurality of media indicators, an action associated with the selected media indicator.

12. The system of claim 11, wherein the processing circuitry is further configured to indicate the number of presently available media that are associated with a media group option.

13. The system of claim 11, wherein the one or more media group options are user-defined.

14. The system of claim 13, wherein the user-defined media group options comprise media indicators that meet a user-defined criteria.

15. The system of claim 14, wherein the user-defined criteria is a user-defined search.

16. The system of claim 11, wherein the processing circuitry is further configured to generate for display a media sub-group option associated with a media group option, wherein at least one of the plurality of media indicators is associated with the media sub-group option.

17. The system of claim 16, wherein the processing circuitry is further configured to indicate the number of media indicators that are associated with the media sub-group option.

18. The system of claim 11, wherein the processing circuitry is further configured to receive the selection of a media group option from a user.

19. The system of claim 11, wherein the processing circuitry is further configured to receive the selection of a media indicator from a user.

20. The system of claim 11, wherein the action comprises presenting media that is identified by the selected media indicator in response to the media indicator selection.

* * * * *